United States Patent [19]
Hirozawa et al.

[11] Patent Number: 6,008,722
[45] Date of Patent: *Dec. 28, 1999

[54] ANTI-VEHICLE-THIEF APPARATUS AND CODE SETTING METHOD OF THE APPARATUS

[75] Inventors: Manabu Hirozawa, Hiroshima; Atsushi Okamitsu, Kure; Kazufumi Adachi, Higashihiroshima; Hiroshi Tagawa, Hiroshima, all of Japan

[73] Assignees: Mazda Motor Corporation; Naldec Corporation, both of Hiroshima, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/505,079

[22] Filed: Jul. 21, 1995

[30] Foreign Application Priority Data

Aug. 2, 1994 [JP] Japan ................................ 6-181146
Aug. 2, 1994 [JP] Japan ................................ 6-181147

[51] Int. Cl.$^6$ ................................................. B60R 25/10
[52] U.S. Cl. .................. 340/426; 340/428; 340/825.31; 340/825.32; 307/10.2; 307/10.5
[58] Field of Search ................................ 340/426, 825.3, 340/825.31, 825.32, 428; 307/10.2, 10.5

[56] References Cited

U.S. PATENT DOCUMENTS

| | | | |
|---|---|---|---|
| 4,274,080 | 6/1981 | Brunken | 340/426 |
| 4,920,338 | 4/1990 | Tsunoda et al. | |
| 4,990,906 | 2/1991 | Kell et al. | 340/825.31 |
| 4,993,627 | 2/1991 | Phelan et al. | 340/825.31 |
| 5,113,182 | 5/1992 | Suman et al. | 340/825.31 |
| 5,278,547 | 1/1994 | Suman et al. | 340/426 |
| 5,406,274 | 4/1995 | Lambropoulos et al. | 340/825.69 |
| 5,416,471 | 5/1995 | Treharne et al. | 340/825.31 |
| 5,422,632 | 6/1995 | Bucholtz et al. | 340/825.31 |
| 5,477,214 | 12/1995 | Bartel | 340/825.31 |
| 5,479,154 | 12/1995 | Wolfram | 340/825.31 |
| 5,513,105 | 4/1996 | Krones | 364/424.01 |
| 5,677,680 | 10/1997 | Yoda | 340/825.31 |

FOREIGN PATENT DOCUMENTS

| | | |
|---|---|---|
| 2 441 036 | 11/1978 | France . |
| 3613605 A1 | 4/1986 | Germany . |
| 42 42 492 A1 | 12/1992 | Germany . |
| 43 17 114 A1 | 5/1993 | Germany . |
| 43 31 664 C1 | 9/1993 | Germany . |
| 44 07 692 A1 | 3/1994 | Germany . |
| 44 07 692 C2 | 3/1994 | Germany . |
| 63-24066 | 2/1988 | Japan . |
| 2-105469 | 6/1990 | Japan . |
| 6-153278 | 5/1994 | Japan . |
| 6-167151 | 6/1994 | Japan . |
| 6-261374 | 9/1994 | Japan . |
| WO 94/15048 | 7/1994 | WIPO . |

OTHER PUBLICATIONS

Communication Pursuant to article 115(2), dated May 12, 1997 (EPC application 95111837.1–1523/0695675).

Primary Examiner—Daniel J. Wu

[57] ABSTRACT

An anti-vehicle-thief apparatus registers specific ID codes of a plurality of keys, and determines validity of a key, for example, in accordance with an operation of the key 1 including a transponder having one of the registered specific ID codes. The anti-vehicle-thief apparatus registers a code specific to the key and confirms an operation in which an ignition switch is turned on and off five times by using the key, where this operation is for changing the ID codes specific to the plurality of keys registered in EEPROMs. After the confirmation of the operation, ID codes specific to a plurality of new keys are successively registered, thereby preventing a third person from using the old keys, as well as making registration of the ID codes specific to the new keys easily.

38 Claims, 16 Drawing Sheets

ANTI-VEHICLE-THIEF APPARATUS AND CODE SETTING METHOD OF THE APPARATUS

BACKGROUND OF THE INVENTION

The present invention relates to an anti-vehicle-thief apparatus and a code setting method of the apparatus.

Recently, burglaries of vehicles occur more frequently in many countries. In order to prevent burglaries, many types of burglar alarms and the like have been suggested, e.g., a key-less entry system and the like as a conventional burglar alarm. In a suggested key-less entry system, after a reset switch in the receiving side is powered on, an identification code sent from a transmitter is stored, as disclosed in Japanese Utility Model Application Laid-Open No. 2-105469. Further, an anti-vehicle-thief system for vehicles, so called an immobilizer unit, has been developed. In this system, if a burglar enters a vehicle and turns on the ignition switch, the system does not allow the engine of the vehicle to start.

However, there is a problem in the aforesaid conventional burglar alarms in which, when a burglar enters a vehicle and the burglar alarm sounds the alarm, since the alarm sound is frequently heard recently, passers-by do not give much attention to the alarm sound.

Further, in the key-less entry system, it is possible to prevent a burglar from entering a vehicle by a door. However, if the burglar breaks a window and enter the vehicle, it is not very difficult to turn on the ignition switch.

SUMMARY OF THE INVENTION

The present invention has been made in consideration of the above situation, and has its first object to provide an anti-vehicle-thief apparatus and a code setting method of the apparatus capable of preventing a third person from using a key to enter a vehicle, thus preventing a burglary of the vehicle as well as of easily registering codes specific to new keys.

Further, its second object is to provide an anti-vehicle-thief apparatus and a code setting method of the apparatus capable of preventing a third person from using a key to enter a vehicle, thus preventing a burglary of the vehicle as well as of easily initializing codes specific to keys.

According to the present invention, the foregoing objects are attained by providing an anti-vehicle-thief apparatus in which codes specific to a plurality of keys are registered and which determines validity of keys in accordance with operations of one of the plurality of keys having the registered codes, comprising: storage means for registering and storing the codes specific to each of the plurality of keys; confirmation means for confirming a predetermined operation for changing the codes specific to each of the plurality of keys, registered in the storage means; and registration means for successively registering codes specific to a plurality of keys other than a key having a registered codes after the confirmation of the predetermined operation.

Further, the foregoing objects are attained by providing a code setting method of anti-vehicle-thief apparatus in which codes specific to a plurality of keys are registered and which determines validity of keys in accordance with operations of one of the plurality of keys having the registered codes, comprising: a confirmation step of confirming a predetermined operation for changing the registered codes specific to each of the plurality of keys; and a registration step of successively registering codes specific to a plurality of keys other than a key having a registered codes after the confirmation of the predetermined operation.

According to the apparatus and the method as described above, codes specific to keys can be set easily.

In accordance with the present invention as described above, the confirmation means preferably confirms at least a single registered code before confirming the predetermined operation.

Further, in accordance with the present invention as described above, at the confirmation step, at least a single registered code is preferably confirmed before confirming the predetermined operation.

According to the apparatus and the method as described above, it is possible to prevent a third person from using keys having registered codes.

Further, in accordance with the present invention as described above, preferably, the predetermined operation is that an ignition switch is turned on and off a plurality of times by using the key having the registered code.

According to the apparatus and the method as described above, when a key is lost, codes specific to keys can be set easily.

Furthermore, the foregoing objects are attained by providing an anti-vehicle-thief apparatus comprising: a plurality of keys having specific codes; determination means for determining validity of keys; and engine controlling means, wherein the determination means includes: first storage means for storing codes specific to each of the plurality of keys; confirmation means for confirming a predetermined operation for changing the codes specific to each of the plurality of keys; and first registration means for successively registering codes specific to a plurality of keys other than the key whose code has been registered after the confirmation of the predetermined operation, and wherein the engine controlling means includes: second storage means for registering and storing the codes specific to each of the plurality of keys; and second registration means for successively registering the codes, from the determination means, specific to each of the plurality of keys. According to this configuration, codes specific to keys can be changed easily.

In accordance with the present invention as described above, the determination means preferably stores codes of a plurality of keys including a key whose code has been registered in the first storage means and transmits the codes to the engine controlling unit. According to this configuration, it is possible to prevent a vehicle from being stolen by using a lost key.

Further, in accordance with the present invention as described above, the engine controlling means preferably stores the codes, transmitted from the determination means, of the plurality of keys including the key whose code has been registered in the second storage means and checks whether or not any one of the transmitted codes is identical to any one of the codes having been registered in the second storage means. According to this configuration, it is possible to prevent codes from being changed by a key other than keys whose codes are registered.

Furthermore, in accordance with the present invention as described above, the engine controlling means preferably registers the transmitted codes in accordance with the check result. According to this configuration, the codes specific to the new keys can be registered certainly.

Further, the foregoing objects are attained by providing an anti-vehicle-thief apparatus comprising: a plurality of keys having specific codes; determination means for determining validity of keys; and engine controlling means, wherein the determination means and the engine controlling means perform initial settings of the specific codes by including: respective storage means having areas for storing the codes specific to each of the plurality of keys; and respective controlling means for controlling so as to store inputted codes specific to the keys in the areas of the respective storage means when data having been stored in the areas satisfy predetermined conditions. According to this configuration, initial settings of the specific codes can be easily performed.

In accordance with the present invention as described above, the respective controlling means preferably store the codes specific to each of the plurality of keys in the respective areas when the areas of the determination means and the engine controlling means are in initialized states. According to this configuration, initial settings of the specific codes can be easily performed.

Further, in accordance with the present invention as described above, the initialized states are that data stored in the areas preferably consist of 0's or F's. According to this configuration, the initialized state can be determined certainly.

Furthermore, in accordance with the present invention as described above, the respective controlling means preferably store the codes specific to each of the plurality of keys in the respective areas of the determination means and the engine controlling means when codes of predetermined values are stored in the respective areas. According to this configuration, after the apparatus of the present invention is tested by using a predetermined code in a part manufacturing maker, new specific codes can be easily set in accordance with the predetermined code before shipping the apparatus.

Further, in accordance with the present invention as described above, the codes of predetermined values are preferably maker codes which are set while the determination means and the engine controlling means are assembled. According to this configuration, the apparatus of the present invention can be checked by using each maker code at each maker.

Further, in accordance with the present invention as described above, the respective controlling means preferably check each of the codes specific to each of the plurality of keys a plurality of times, and store the codes in the respective areas in accordance with the check result. According to this configuration, it is possible to prevent specific codes from being set by improper keys whose codes are not registered.

Further, in accordance with the present invention as described above, electricity is preferably supplied to the determination means directly from a battery, and electricity is supplied to the engine controlling means during a period when an ignition switch is on. According to this configuration, specific codes can be transmitted to the engine controlling unit after temporarily storing the specific codes and comparing them to codes which have been registered in the determination means.

Further, in accordance with the present invention as described above, the respective controlling means preferably comprise judging means for judging whether or not voltages of respective power supply for the determination means and the engine controlling means are stable, and store the codes specific to each of the plurality of keys in the respective areas only when the voltages are stable. According to this configuration, it is possible to prevent improper operations and improper data registration caused by change of the voltage when the apparatus is powered on.

Further, the foregoing objects are also attained by providing an anti-vehicle-thief apparatus comprising: a plurality of keys having specific codes; and determination means for determining validity of keys, wherein the determination means performs initial settings of the specific codes by including: storage means having an area for storing the codes specific to each of the plurality of keys; controlling means for controlling so as to store inputted codes specific to each of the plurality of keys in the area of the storage means when data having been stored in the area satisfies predetermined conditions. According to this configuration, initial settings of the specific codes can be easily performed.

In accordance with the present invention as described above, the controlling means preferably stores the codes specific to each of the plurality of keys in an the area when the area of the determination means is in an initialized state. According to this configuration, initial settings of the specific codes can be easily performed.

Further, in accordance with the present invention as described above, preferably, the initialized state is that data stored in the area consists of 0's or F's. According to this configuration, the initialized state can be determined accurately.

Furthermore, in accordance with the present invention as described above, the controlling means preferably stores the codes specific to each of the plurality of keys in the area of the determination means when codes of predetermined values are stored in the area. According to this configuration, after the apparatus of the present invention is tested by using a predetermined code in a part manufacturing maker, new specific codes can be easily set in accordance with the predetermined code before shipping the apparatus.

Further, in accordance with the present invention as described above, the codes of predetermined values are preferably maker codes which are set while the determination means is assembled. According to this configuration, the apparatus of the present invention can be checked by using each maker code at each maker.

Further, in accordance with the present invention as described above, the controlling means preferably checks each of the codes specific to each of the plurality of keys a plurality of times, and stores the codes in the area in accordance with the check result. According to this configuration, it is possible to prevent specific codes from being set by improper keys whose codes are not registered.

Further, in accordance with the present invention as described above, electricity is preferably supplied to the determination means directly from a battery. According to this configuration, specific codes can be transmitted to the engine controlling unit after temporarily storing the specific codes and comparing them to codes which have been registered in the determination means.

Further, in accordance with the present invention as described above, the controlling means preferably comprises judging means for judging whether or not voltage of power supply for the determination means is stable, and stores the codes specific to each of the plurality of keys in the area only during a period when the voltage is stable. According to this configuration, it is possible to prevent improper operations and improper data registration caused by change of the voltage when the apparatus is powered on.

Further, the foregoing objects are also attained by providing an anti-vehicle-thief apparatus comprising: a plurality of keys having specific codes; and engine controlling means, wherein the engine controlling means performs initial settings of the specific codes by including: storage means having an area for storing the codes specific to each of the plurality of keys; controlling means for controlling so as to store inputted codes specific to each of the plurality of keys in the area of the storage means when data having been stored in the area satisfies predetermined conditions. According to this configuration, initial settings of the specific codes can be easily performed.

In accordance with the present invention as described above, the controlling means preferably stores the codes specific to each of the plurality of keys in the area when the area of the determination means is in an initialized state. According to this configuration, initial settings of the specific codes can be easily performed.

Further, in accordance with the present invention as described above, preferably, the initialized state is that data stored in the area consisting of 0's or 1's. According to this configuration, the initialized state can be determined certainly.

Furthermore, in accordance with the present invention as described above, the controlling means preferably stores the codes specific to each of the plurality of keys in the area of the engine controlling means when codes of predetermined values are stored in the area. According to this configuration, after the apparatus of the present invention is tested by using a predetermined code in a part manufacturing maker, new specific codes can be easily set in accordance with the predetermined code before shipping the apparatus.

Further, in accordance with the present invention as described above, the codes of predetermined values are preferably maker codes which are set while the engine controlling means is assembled. According to this configuration, the apparatus of the present invention can be checked by using each maker code at each maker.

Further, in accordance with the present invention as described above, the controlling means preferably checks each of the codes specific to each of the plurality of keys a plurality of times, and stores the codes in the area in accordance with the check result. According to this configuration, it is possible to prevent specific codes from being set by improper keys whose codes are not registered.

Further, in accordance with the present invention as described above, electricity is preferably supplied to the engine controlling means during an ignition switch is on. According to this configuration, a code is compared with the codes which have been registered, thus preventing improper codes from being registered.

Further, in accordance with the present invention as described above, the controlling means preferably comprises judging means for judging whether or not voltage of power supply for the engine controlling means is stable, and stores the codes specific to each of the plurality of keys in the area only when the voltage is stable. According to this configuration, it is possible to prevent improper operations and improper data registration caused by change of the voltage when the apparatus is powered on.

DETAILED DESCRIPTION OF THE PREFERRED EMBODIMENT

Preferred embodiments of the present invention will be described in detail in accordance with the accompanying drawings.

Figure 1:
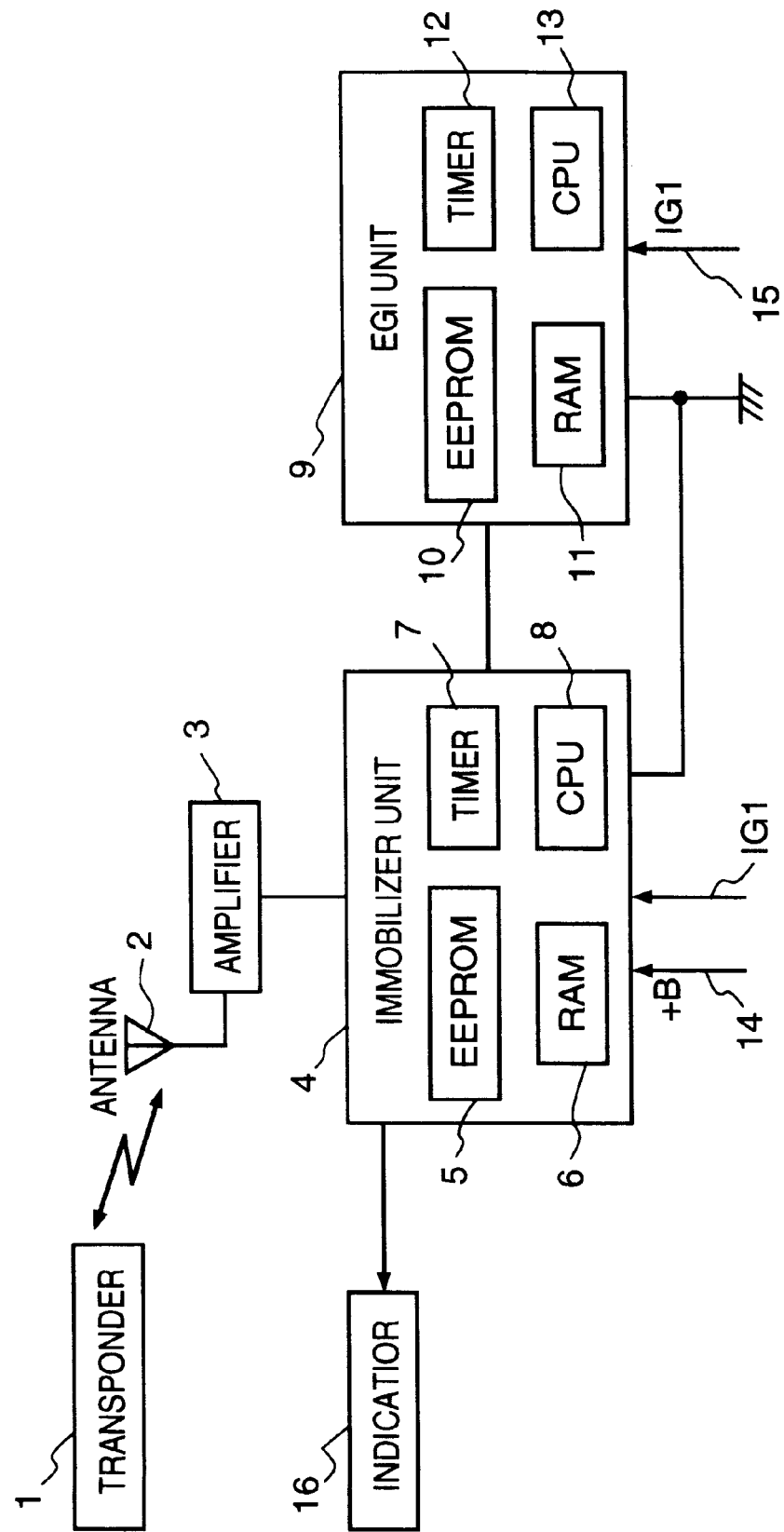
FIG. 1 is a block diagram of an anti-vehicle-thief apparatus according to an embodiment of the present invention.

FIG. 1 is a block diagram of an anti-vehicle-thief apparatus of the present invention in an embodiment. A configuration of the anti-vehicle-thief apparatus of the present invention will be explained referring to FIG. 1. The anti-vehicle-thief apparatus used in the embodiment is a system comprising a transponder 1, an antenna 2 for receiving signals from the transponder 1, an amplifier 3 for amplifying the signals received by the antenna 2, an immobilizer unit 4 which is controlled in accordance with the signals from the amplifier 3, and an EGI unit 9 for controlling the engine. More specifically, the transponder 1 is included in a key, used by a driver, for controlling the ON and OFF of an ignition switch of a vehicle. The antenna 2 is an ignition coil antenna which is coupled with the ON and OFF of the ignition switch. The amplifier 3 amplifies the signal, applied when the coil antenna starts operating, to a fixed voltage so as to obtain a high voltage.

The immobilizer unit 4 is a controller, having been developed in Europe for preventing burglary, which prohibits to start the engine.

The immobilizer unit 4 is supplied with power from a battery (+B) (not shown) via a supply line 14 and a power supply (not shown) which supplies power in accordance with the ON or OFF state of the ignition switch via a supply line 15. The immobilizer unit 4 is given with ON or OFF data of the ignition switch in accordance with the battery (+B) connected via the supply line 14 and the power supply connected via the supply line 15 as well as ID data from the transponder 1 in accordance with the voltage amplified by the amplifier 3. Thereafter, the immobilizer unit 4 transmits a predetermined control signal to the EGI unit. Further, since the immobilizer unit 4 is connected to the battery 14, when the engine is stopped and the ignition switch is turned off, electricity is kept supplied to the immobilizer unit 4. Accordingly, the immobilizer unit 4 maintains a stand-by state. Furthermore, the immobilizer unit 4 is also connected to the indicator 16 which is provided within a vehicle, and it controls the ON and OFF of internal lights on the basis of the ID data sent from the transponder 1.

The EGI unit 9 electronically controls revolutions per minute of the engine, the amount of fuel injection, and the like.

A configuration of the EGI unit 9 is similar to the one of the immobilizer unit 4, and comprises an EEPROM 10 for storing data in advance, RAM 11 for temporarily storing data during transmitting/receiving data to/from the immobilizer unit 4, a timer 12 which sends timing data of the transmission and reception of data stored in the above memories, and CPU 13 for controlling transmission and reception of data to/from the immobilizer unit 4 in accordance with the timing data from the timer 12. Further, the EGI unit 9 receives a predetermined control signal from the immobilizer unit 4 and controls the starter and the amount of fuel injection in accordance with the control signal. However, deferring from the immobilizer unit 4, the EGI unit 9 is connected to only the switch power supply 15 which is coupled with ON and OFF of the ignition switch. Therefore, when the engine is stopped and the ignition switch is turned off, electricity is not supplied to the EGI unit 9.

Figure 2:
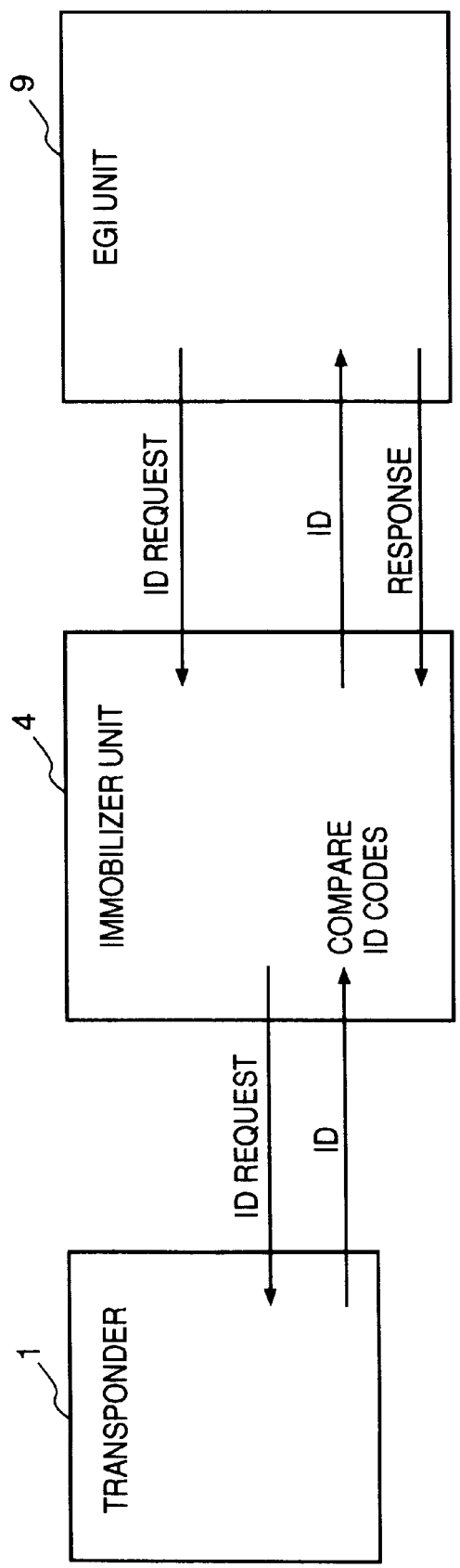
FIG. 2 is an explanatory view of an operational sequence for determining ID data of a transponder 1, shown in FIG. 1, having a specific ID data.
Figure 3:
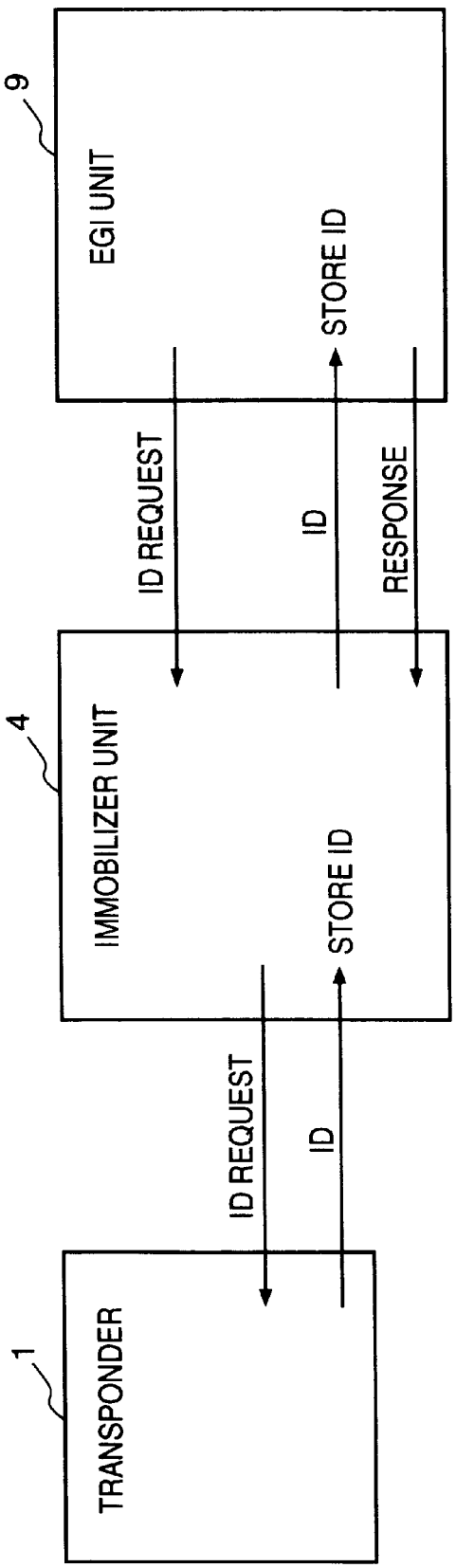
FIG. 3 is an explanatory view of an operational sequence of an initial write process for writing the ID data in an assembly factory of the anti-vehicle-thief apparatus of the present invention.

Next, referring to FIGS. 2 and 3, transmission and reception of data between the transponder 1, the immobilizer unit 4, and the EGI unit 9 will be described. FIG. 2 is an explanatory view of an processing sequence of ID data determination in the transponder 1 which has ID data specific to it. FIG. 3 is an explanatory view of an operational sequence of an initial write process for writing the ID data in an assembly factory into the anti-vehicle-thief apparatus of the present invention.

<Determination of an ID code>

Referring to FIG. 2, when the transponder is inserted into the ignition keyhole and turned to a position where the ignition switch is turned on, the immobilizer unit 4 issues an ID request to the transponder 1. Then the transponder 1 sends an ID signal, which is used as a trigger signal for the immobilizer unit 4, to the immobilizer unit 4. The immobilizer unit 4 temporarily stores the sent ID code of the transponder 1 in RAM 6 in the immobilizer unit 4. This operation is repeated twice so as to cope with an unexpected trouble during communication. Thereafter, ID codes, registered in an EEPROM 5 in the immobilizer unit 4, and the ID code sent from the transponder 1 are compared in CPU 8. At this time, the EGI unit 9 is in a state of waiting for the immobilizing function to be released. In this state, a counter starts counting and whether or not a predetermined condition is satisfied in a predetermined time period is determined. If the condition is satisfied, the EGI unit 9 issues a request to the immobilizer unit 4 for sending the ID code. In response to the ID code request from the EGI unit 9, the immobilizer unit 4 sends the ID code to the EGI unit 9 on the basis of a comparison result of the ID codes. The EGI unit 9 stores the ID code sent from the immobilizer unit 4 in the RAM 11. This operation is repeated twice, and the ID code from the immobilizer unit 4 and the ID code registered in the EEPROM 10 in the EGI unit 9 are compared, and the comparison result of the ID codes is sent to the immobilizer unit 4.

<Initial Write Process>

Next, a processing sequence of initial write process for data when no ID code is written in the EEPROMs of the immobilizer unit 4 and the EGI unit 9. Similarly to the process explained with reference to FIG. 2, in a processing shown in FIG. 3, when the transponder is inserted into the ignition keyhole and turned to a position where the ignition switch is turned ON, the immobilizer unit 4 issues an ID request to the transponder 1. Then the transponder 1 sends an ID signal to the immobilizer unit 4. The immobilizer unit 4 temporarily stores the sent ID code of the transponder 1 in the RAM 6. This operation is repeated twice so as to cope with an unexpected trouble during communication. Thereafter, whether or not the ID code has already been registered in the EEPROM 5 in the immobilizer unit 4 is determined. In a case where no ID code is registered in the EEPROM 5, the ID code stored in the RAM 6 is registered in the EEPROM 5. By this time, the EGI unit 9 has issued an request for an ID code to the immobilizer unit 4. In response to the ID code request from the EGI unit 9, the immobilizer unit 4 sends the ID code to the EGI unit 9. The EGI unit 9 then stores the ID code sent from the immobilizer unit 4 in the RAM 11. This operation is repeated twice, and whether or not the two ID codes sent from the immobilizer unit 4 in the repeated operation are identical to each other is determined. If they are identical and no ID code is registered in the EEPROM 10 in the EGI unit 9, the ID code is registered there. Then, the EGI unit 9 sends a signal to inform the immobilizer unit 4 that the code is registered.

<Operational Sequence of ID Determination in the Immobilizer unit>

Next, referring to FIGS. 4 through 8, an operational sequence of the ID code determination and of the initial write process will be described in detail.

Figure 4:
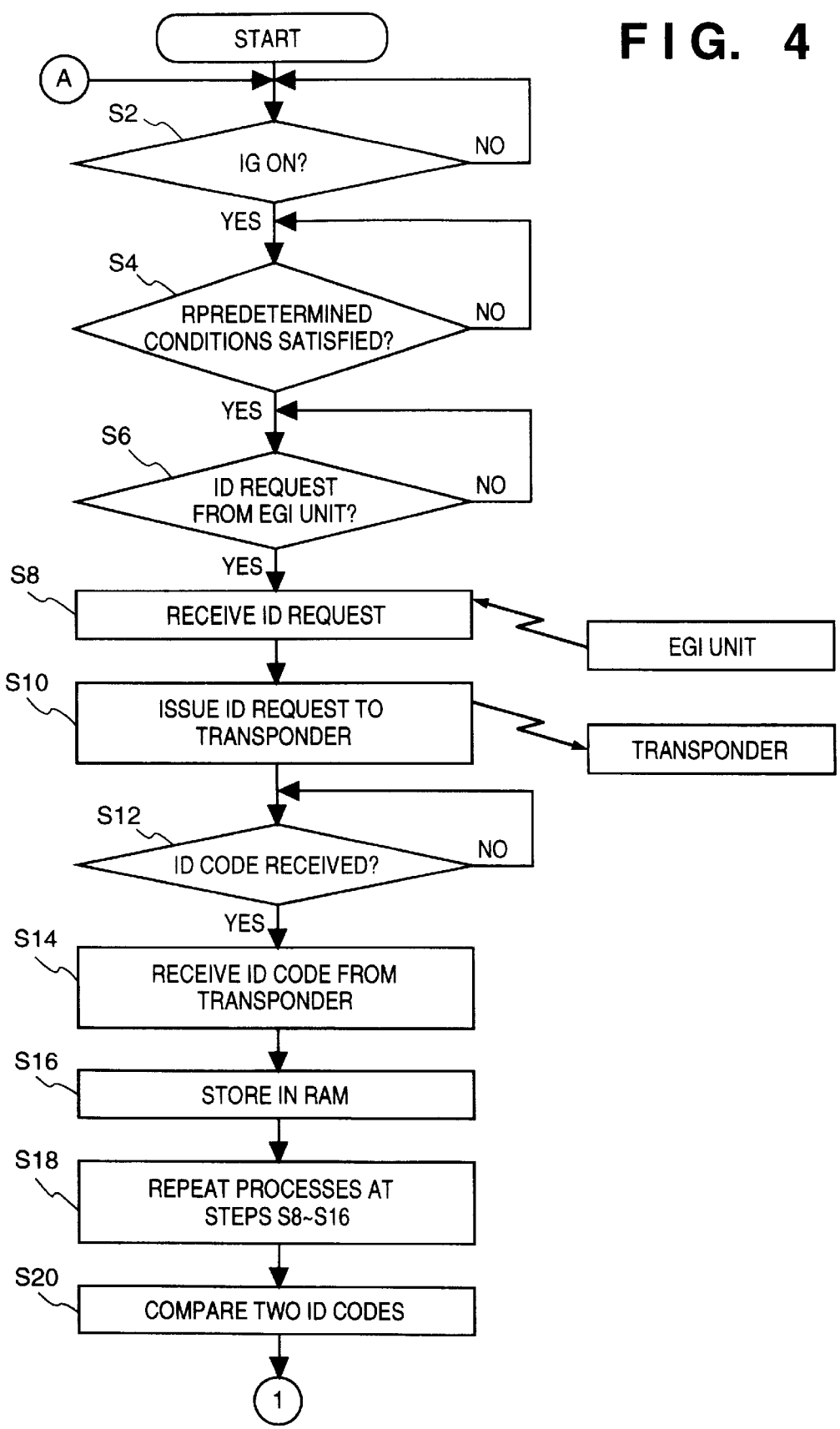
FIG. 4 is a flowchart showing an operational sequence of an ID code determination and the initial write process in an immobilizer unit.
Figure 5:
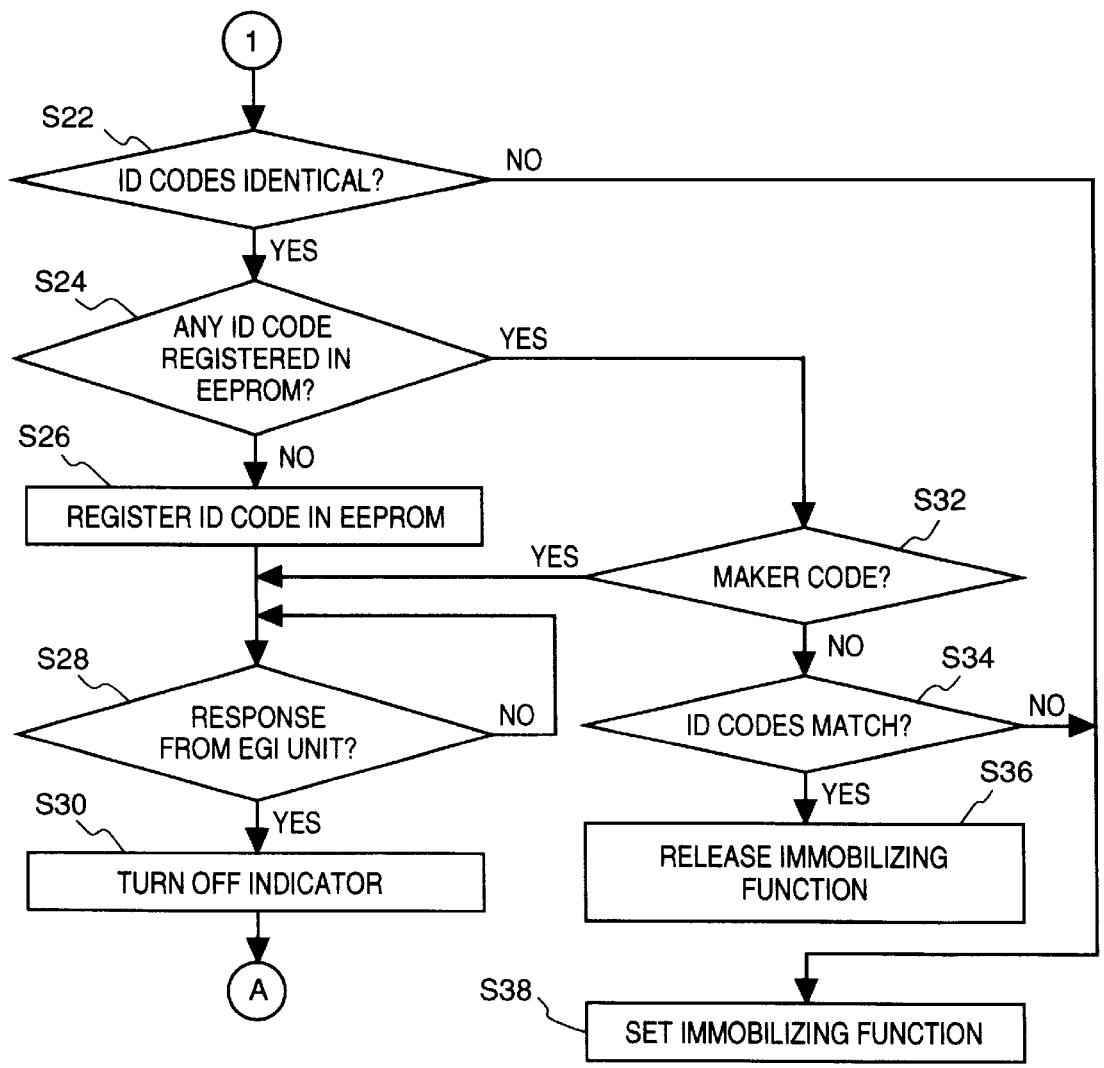
FIG. 5 is a flowchart showing the operational sequence of the ID code determination and the initial write process in the immobilizer unit.

FIGS. 4 and 5 are flowcharts showing the operational sequence of the ID code determination and the initial write process in an immobilizer unit. In FIGS. 4 and 5, when the process is started, whether or not the ignition switch is turned ON by the transponder and the engine is started is determined at step S2. When it is determined that the ignition switch is ON (YES at step S2), the process proceeds to step S4. Whereas when it is determined that the ignition switch is not ON (NO at step S2), then the process returns to the beginning of the process. At step S4, whether or not predetermined conditions (whether or not the engine is in a stable state in which 500 rpm and a voltage of greater or equal to 10 V) are satisfied is determined. If the conditions are satisfied (YES at step S4), the process proceeds to step S6. In contrast, if they are not satisfied (NO at step S4), the process returns to the beginning of step S4. At step S6, whether or not an ID request is issued by the EGI unit is determined. When it is determined that the ID request is issued (YES at step S6), an indicator is turned ON and the process proceeds to step S8. Whereas if it is determined that the ID request is not issued (NO at step S6), the process returns to the beginning of step S6. At step S8, the ID request is received from the EGI unit. Thereafter at step S10, in response to the ID request at step S8, the ID request is issued to the transponder. Then, the process proceeds to step S12.

At step S12, whether or not an ID code is received from the transponder to which the ID request is issued is determined. If it is (YES at step S12), the process proceeds to step S14, whereas if it is not (NO at step S12), the process returns to the beginning of step S12, and the immobilizing function is set after the process at step S12 is repeated a predetermined number of time or a predetermined time period has elapsed. Then at step S14, the ID is received from the transponder. At step S16, the ID code received from the transponder is temporarily stored in the RAM provided in the immobilizer unit. At step S18, steps S8 through S16 are repeated once more. As a result, two ID codes received from the transponder are stored in the RAM. At step S20, the stored two ID codes are compared. Thereafter, the process moves to step S22 where whether or not the two ID codes stored in the RAM are identical to each other is determined. If they are (YES at step S22), the process proceeds to step S24. At step S24, whether or not any ID code is registered in the EEPROM provided in the immobilizer unit is determined. More specifically, whether or not ID code data is any value other than 0 or F is determined. If it is determined that no ID code is registered in the EEPROM of the immobilizer unit (NO at step S24), the process proceeds to step S26. At step S26, the ID code stored in the RAM is registered in the EEPROM of the immobilizer unit and sent to the EGI unit. The process goes to step S28 where whether or not there is any response to the ID code transmission from the EGI unit. If there is (YES at step S28), then the process proceeds to step S30. At step S30, if the response from the EGI unit indicates that the ID code is registered in the EEPROM, then the indicator is turned off and the process returns to step S2. Whereas, if there is no response from the EGI unit (NO at step S28), the process returns to the beginning of step S28.

On the contrary, at step S22, when the two ID codes stored in the RAM do not match each other (NO at step S22), the process goes to step S38 where the immobilizing function is set and the immobilizer unit is locked so that the ignition can not be turned ON (i.e., the engine can not be started), and a lock command is transmitted to the EGI unit.

Further, in a case where an ID code is registered in the EEPROM of the immobilizer unit (YES at step S24), then the process proceeds to step S32 where whether or not the ID code stored in the EEPROM is set by the maker (i.e., maker code) is determined. If it is determined that the ID code stored in the EEPROM is a unit maker code (YES at step S32), the process moves to step S28. Whereas, if the ID code stored in the EEPROM is not the unit maker code (NO at step S32), then the process proceeds to step S34 where whether or not the code stored in the RAM matches the code registered in the EEPROM is determined. If it does (YES at step S34), then the process moves to step S36 where the immobilizing function is released and normal engine control is permitted. On the other hand, when it is determined that the code does not match (NO at step S34), the process moves to step S38 where the immobilizing function is set and the immobilizer unit is locked so that the engine does not start even if the ignition switch is turned ON.

In the aforesaid operational sequence in the immobilizer unit, the processes at steps S24 through S30 are of the initial write process for the ID code, and the processes at steps S22 and S38 and steps S24 and S32 through S36 are of the normal ID code determination process.

<Operational Sequence of ID determination in the EGI unit>

Figure 6:
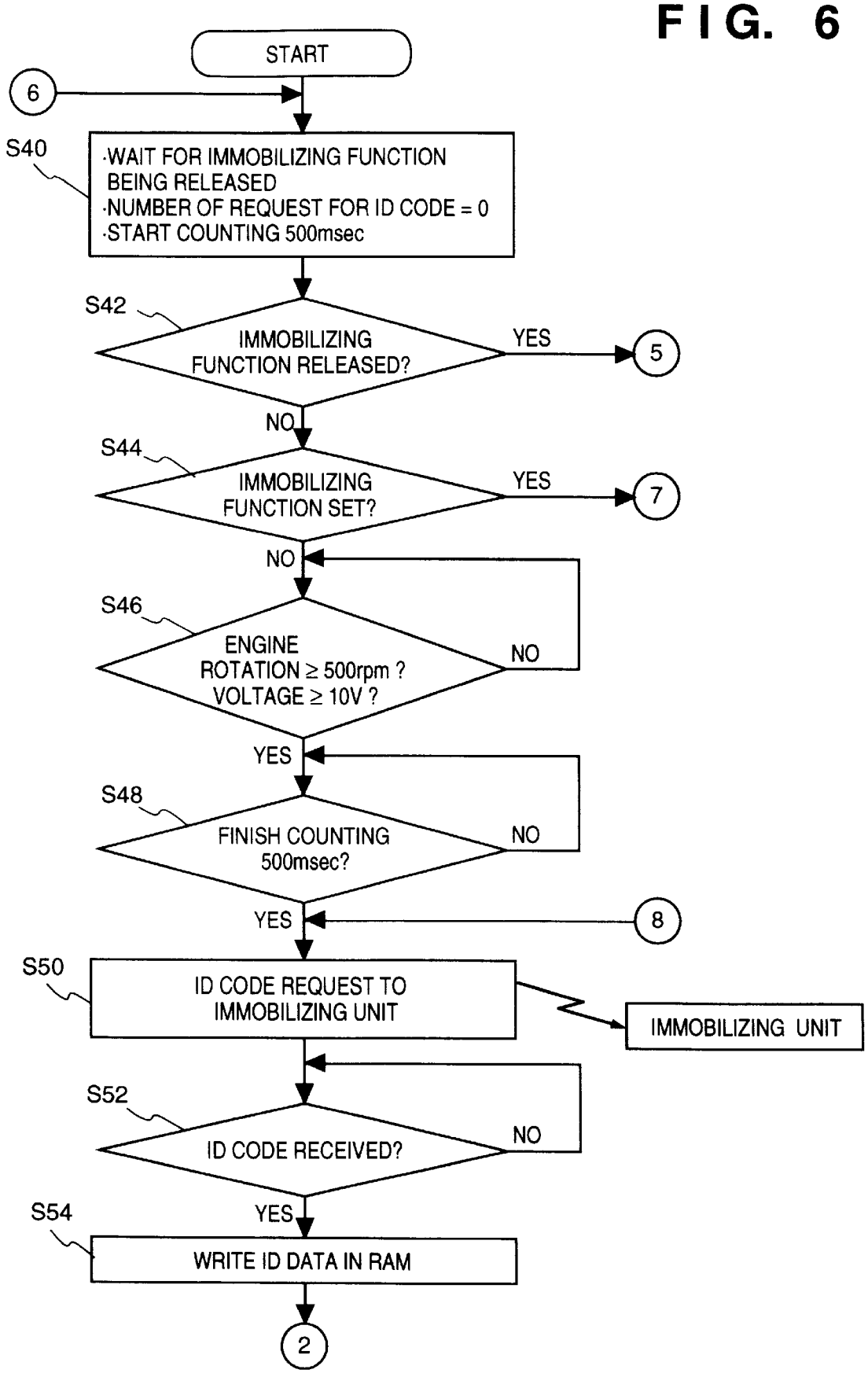
FIG. 6 is a flowchart showing an operational sequence of the ID code determination in an EGI (electronic gasoline injection control) unit.
Figure 7:
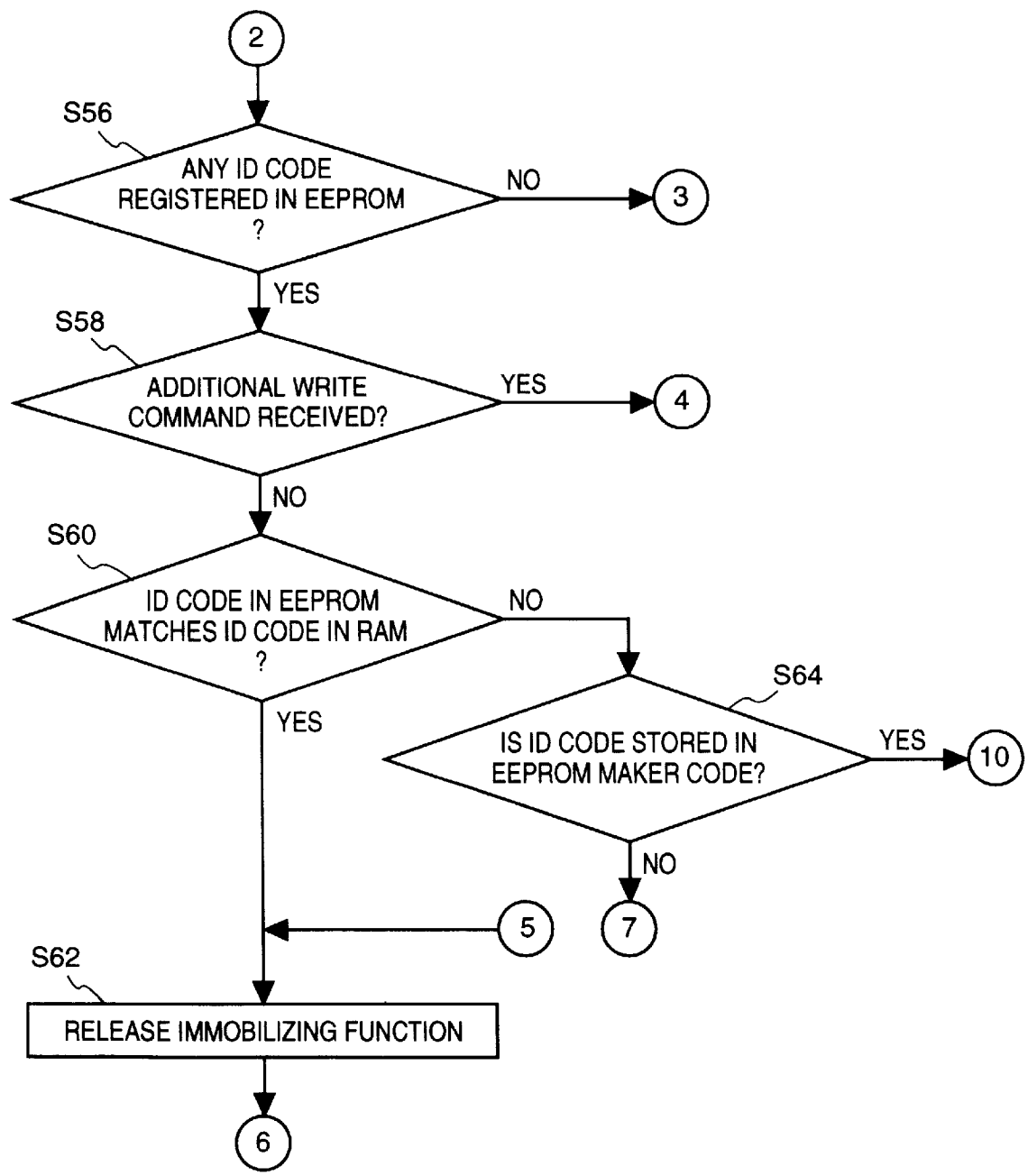
FIG. 7 is a flowchart showing the operational sequence of the ID code determination in the EGI unit.

Next, a processing sequence for determining an ID code in the EGI unit will be explained. FIGS. 6 and 7 are flowcharts showing a determination sequence for determining the ID code in the EGI unit. In FIGS. 6 and 7, when the process is started, since the immobilizing function is set during the ignition switch is OFF, the EGI unit waits for an instruction to release the immobilizing function at step S40, and the timer starts counting until 500 msec. since the ignition is on under a state where the number of request for the ID code to the immobilizer unit is 0. At step S42, whether or not the immobilizing function is released is determined. If it is not (NO at step S42), the process proceeds to step S44, whereas if it is (YES at step S42), then the process moves to step S62 which will be described later. At step S44, whether or not the immobilizing function is set is checked. If it is not (NO at step S44), the process proceeds to step S46, whereas if it is (YES at step S44), the process goes to step S140 in FIG. 15 which will be explained later. At step S46, whether or not predetermined conditions, namely the revolution of the engine is greater or equal to 500 rpm and voltage is greater or equal to 10 V, are satisfied is determined. If they are (YES at step S46), the process proceeds to step S48, whereas if they are not (NO at step S46), the process returns to the beginning of step S46. At step S48, whether or not 500 msec. has been counted by the timer which started at step S40 is determined. If it has (YES at step S48), the process proceeds to step S50, whereas if it has not, the process returns to the beginning of step S48. At step S50, the EGI unit issues an ID code request to the immobilizer unit. Thereafter, the process proceeds to step S52 where whether or not an ID code has been transmitted from the immobilizer unit to the EGI unit is determined. If it has (YES at step S52), the process proceeds to step S54, whereas if it has not (NO at step S52), the process returns to the beginning of step S52. At step S54, the ID data, responded by the immobilizer unit, is temporally stored in the RAM provided in the EGI unit. Then, the process proceeds to step S56. At step S56, whether or not an ID code is registered in the EEPROM provided in the EGI unit is determined. More specifically, whether or not ID code data is any values other than 0 or F is judged. If it is determined that an ID code is registered (YES at step S56), the process proceeds to step S58. At step S58, whether or not an additional write command is received from the immobilizer unit is determined. Regarding the additional write command when the determination at step S58 is YES, it will be explained later. If the additional write command is not received (NO at step S58), the process proceeds to step S60 where whether or not the ID code stored in the RAM matches the ID code registered in the EEPROM in the EGI unit is determined. If they match (YES at step S60), the process proceeds to step S62 where the immobilizing function is released and a normal EGI control is performed. Further, at step S60, if the ID code stored in the RAM does not match the ID code registered in the EEPROM in the EGI unit (NO at step S60), the process proceeds to step S64. At step S64, whether or not the ID code stored in the EEPROM provided in the EGI unit is an ID code set by a unit maker (maker code) is determined. If it is (YES at step S64), the process goes to step S66 in FIG. 8, whereas if it is not (NO at step S64), the process moves to step S140 in FIG. 15 which will be explained later.

<Operational Sequence of an Initial Write Process in the EGI unit>

Next, referring to a flowchart in FIG. 8, an operational sequence of an initial write process in the EGI unit will be explained. When it is determined that no ID code is registered in the EEPROM in the EGI unit at step S56 in FIG. 7 (NO at step S56), the process moves to step S66 in FIG. 8. At step S66, whether or not the EGI unit has issued the ID code request more than once to the immobilizer unit is determined. If it has (YES at step S66), the process proceeds to step S68, whereas if it has not (ID code request is issued once, and NO at step S66), the process returns to step S50 in FIG. 6. At step S68, whether or not the two ID codes stored in the RAM are identical to each other is determined. If they are (YES at step S68), the process proceeds to step S70 where the ID code stored in the RAM in the EGI unit is registered in the EEPROM. Thereafter, the process returns to step S62 in FIG. 7. Whereas, if it is determined that the two ID codes stored in the RAM are not identical (NO at step S68), the process returns to step S50.

Figure 8:
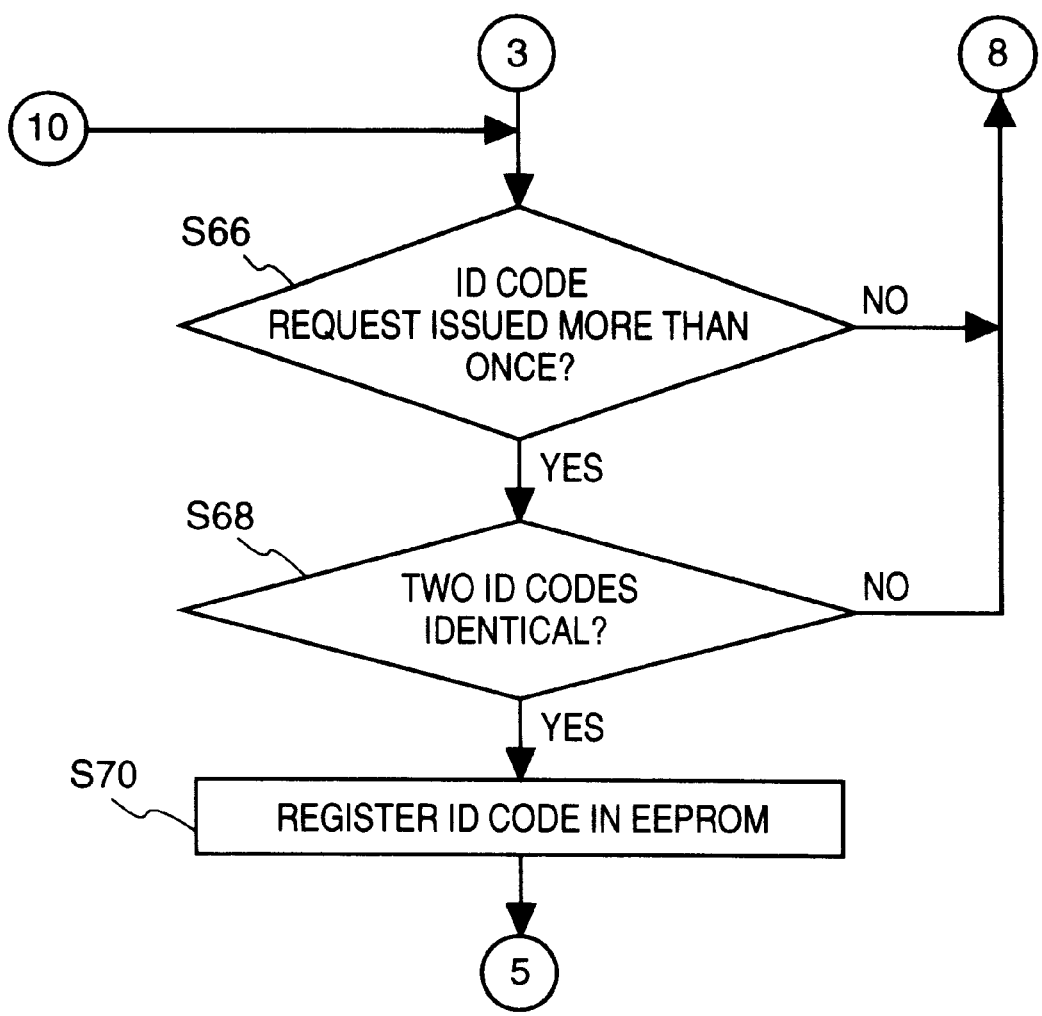
FIG. 8 is a flowchart showing an operational sequence of the initial write process in the EGI unit.

As described above, the operational sequences explained with reference through FIGS. 6 to 8 are for the ID determination and for the initial write process in the EGI unit.

Figure 9:
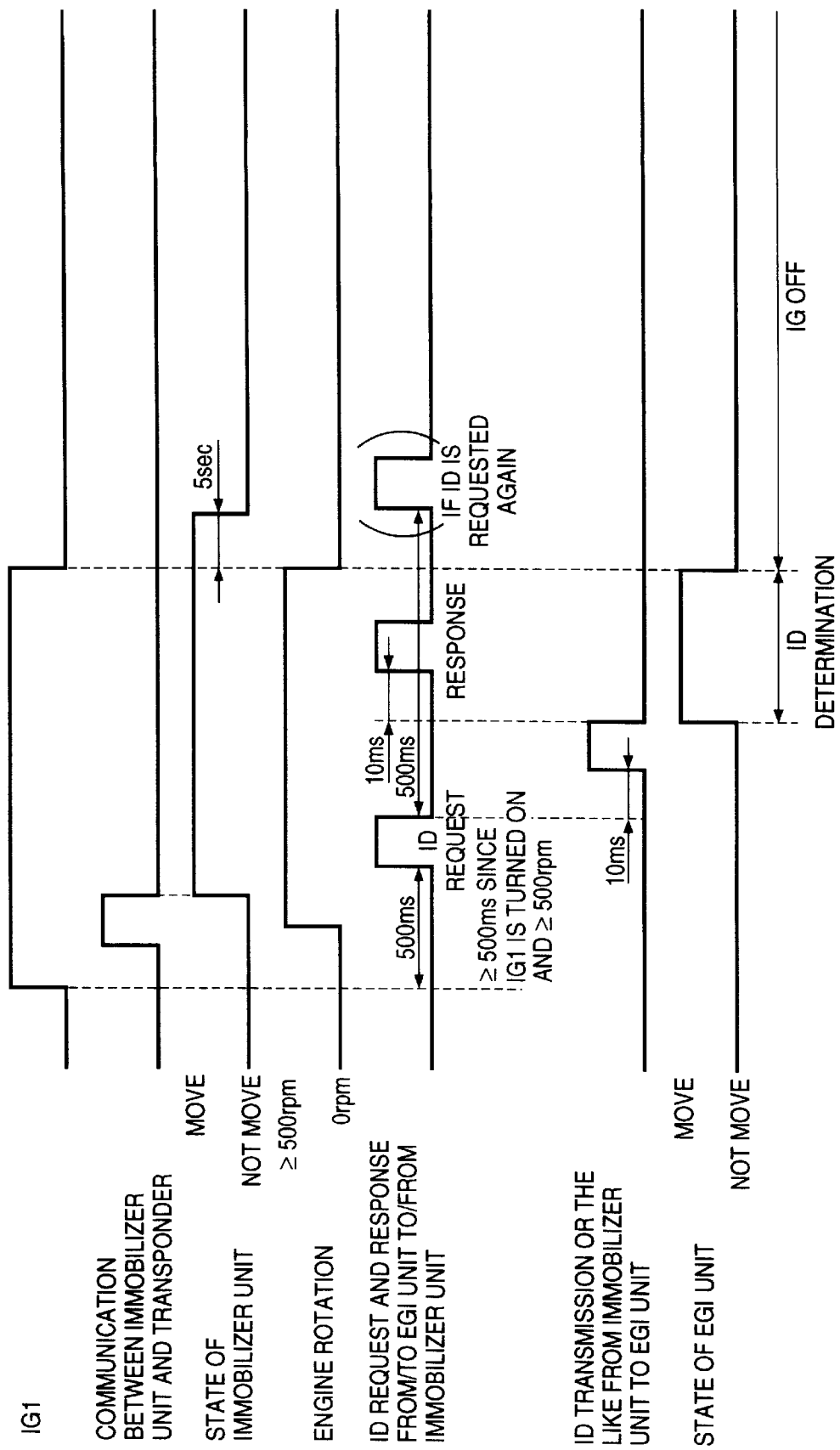
FIG. 9 is a timing chart of each operation in the transponder, an ignition switch, the immobilizer unit, and the EGI unit in the ID code determination.
Figure 10:
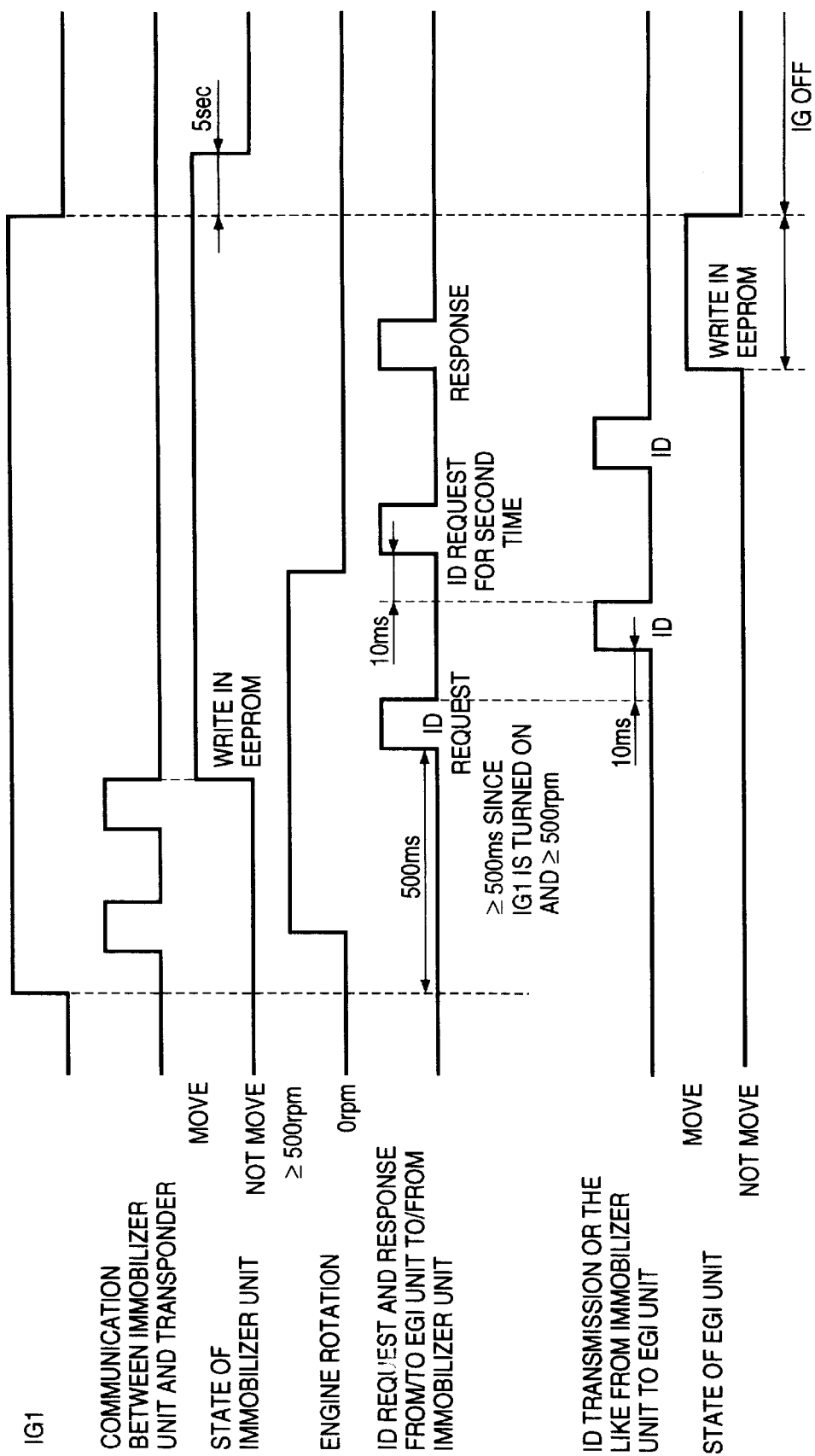
FIG. 10 is a timing chart of each operation in the transponder, the ignition switch, the immobilizer unit, and the EGI unit in the initial write process for ID codes.

FIG. 9 is a timing chart of each operation in the transponder, an ignition switch, the immobilizer unit, and the EGI unit in the ID code determination. Referring to FIG. 9, the immobilizer unit issues an ID request to the transponder when the ignition switch is turned ON, and sends and receives ID code to/from the EGI unit under a stable state in which the number of engine rotation is greater or equal to 500 rpm. FIG. 10 is a timing chart of each operation in the transponder, the ignition switch, the immobilizer unit, and the EGI unit in the initial ID code write process. Referring to FIG. 10, when the ignition switch is turned on, the immobilizer unit issues an ID request to the transponder. Then, if no ID code is registered in the EEPROM of the immobilizer unit, the ID code is registered in the EEPROM of the immobilizer unit, and sent to the EGI unit responding to the ID request from the EGI unit. When the ID is not registered in the EEPROM of the EGI unit, the EGI unit registers the ID code sent from the immobilizer unit in the EEPROM of the EGI unit.

As described above, since maker codes can be set by an immobilizer unit maker and an EGI unit maker for testing in a factory, and ID codes can be changed at a dealer or the like after an anti-vehicle-thief system is assembled, the system can be mass-produced.

<Operational Sequence of an Additional Write Process>

Figure 11:
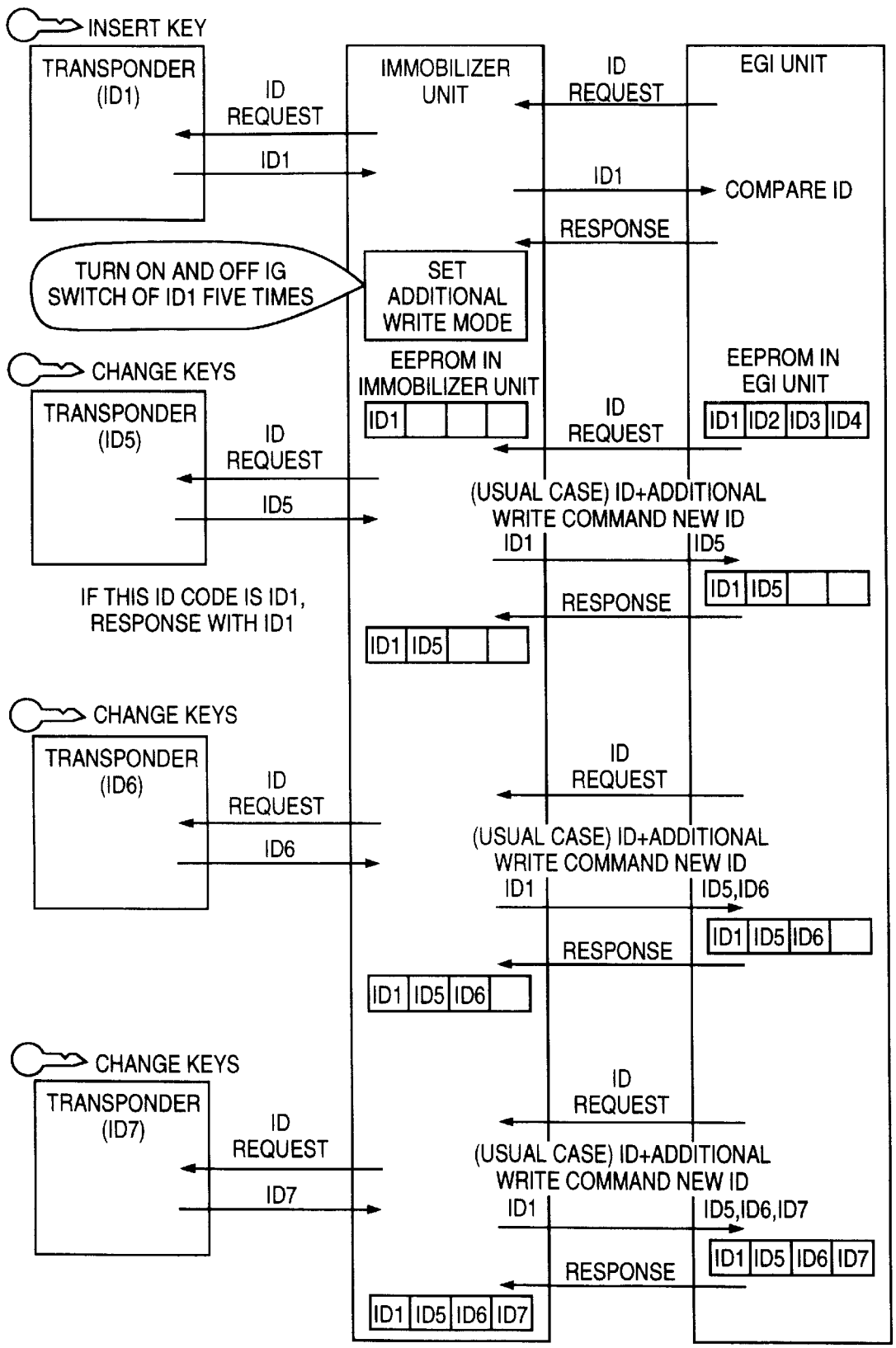
FIG. 11 is an explanatory view of a processing sequence for changing a registered ID code.

Next, an operational sequence of changing registered ID codes will be explained. This process is used in a case where, for instance, when there are transponders 1, 2, 3, and 4 having different ID codes from each other (more specifically keys 1, 2, 3, and 4 having ID1, ID2, ID3 and ID4, respectively), the keys 2, 3, and 4 are stolen or missing out of the aforesaid four keys and new keys 5, 6, and 7 are to be used instead so that a vehicle is not stolen by a third person by using the missing keys, ID codes registered in the immobilizer unit and the EGI unit are changed. FIG. 11 is an explanatory view of a processing sequence for changing registered ID codes. Referring to FIG. 11, a case where ID1, ID2, ID3, and ID4 registered as ID codes are changed to ID1, ID5, ID6 and ID7 will be described. In FIG. 11, since the ID code of the key 1 registered before changing codes is still efficient, thus the key 1 is used first. First, the key 1 is inserted in a keyhole and the engine is started. Then, after the immobilizing function is released, the ignition switch is turned on and off five times. The immobilizer unit is changed to a additional write mode in accordance with this on and off operation. Thereafter, the ID codes other than ID 1 out of ID 1 to ID4 registered in each EEPROM in the immobilizer unit and the EGI unit are cleared. Then the key 1 is pulled out, and the new key 5 is inserted in the keyhole in a predetermined time period (about 4 seconds). Since ID requests are issued from the immobilizer unit to the transponder 5 and from the EGI unit to the immobilizer unit, the transponder 5 transmits its ID code, ID5, to the immobilizer unit. The immobilizer unit receives the ID code ID5 and stores it in the EEPROM. Thereafter, the immobilizer unit transmits the ID codes ID1 and ID5 to the EGI unit in correspondence to the ID request from the EGI unit. The EGI unit receives ID1 and ID5 and registers in the EEPROM. Then, the EGI unit responds to the immobilizer unit that it received the ID code, and issues another ID request. At this time, the ID codes registered in the immobilizer unit and the EGI unit is ID1 and ID5 only.

Likewise, after the key 5 is pulled out, the key 6 is inserted into the keyhole in a predetermined time period. Since ID requests are issued from the immobilizer unit to the transponder 6 and from the EGI unit to the immobilizer unit, the transponder 6 transmits its ID code, ID6, to the immobilizer unit. Since the EGI unit is issuing the ID request to the immobilizer unit, the immobilizer unit receives ID6 and stores it in the EEPROM. Then the immobilizer unit transmits the ID codes ID1, ID5, and ID6 to the EGI unit in correspondence to the ID request from the EGI unit. The EGI unit receives ID1, ID5 and ID6 and registers them in the EEPROM. Then, the EGI unit responds to the immobilizer unit that it received the ID codes, and issues another ID request. At this time, the ID codes registered in the immobilizer unit and the EGI unit is ID1, ID5, and ID6.

Similarly, after the key 6 is pulled out, the key 7 is inserted into the keyhole in a predetermined time period. Since ID requests are issued from the immobilizer unit to the transponder 7 and from the EGI unit to the immobilizer unit, the transponder 7 transmits its ID code ID7 to the immobilizer unit. Since the EGI unit is issuing the ID request to the immobilizer unit, the transponder 7 sends a new ID code ID7 to the immobilizer unit. Thereafter, the immobilizer unit receives ID7 and stores it in the EEPROM . Then the immobilizer unit transmits the ID codes ID1, ID5, ID6, and ID7 to the EGI unit in correspondence to the ID request from the EGI unit. The EGI unit receives ID1, ID5, ID6, and ID7 and registers them in the EEPROM. Then, the EGI unit responds to the immobilizer unit that it received the ID codes. At this time, the ID codes registered in the EGI unit is ID1, ID5, ID6, and ID7, thus completing change of all the ID codes which are to be changed.

<Operational Sequence of an Additional Write Process in the Immobilizer Unit>

Figure 12:
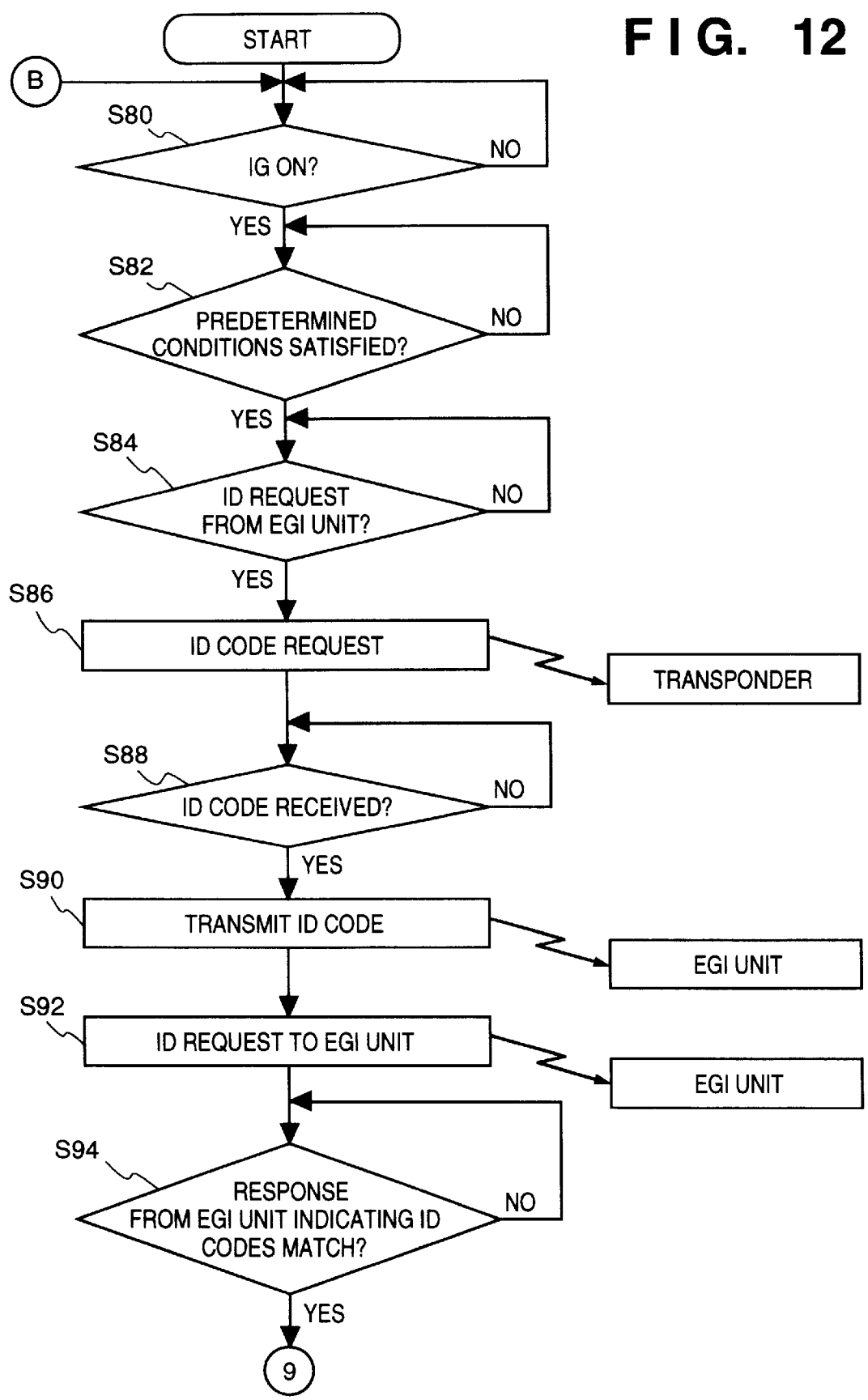
FIG. 12 is a flowchart showing an operational sequence of an additional write process in the immobilizer unit.
Figure 13:
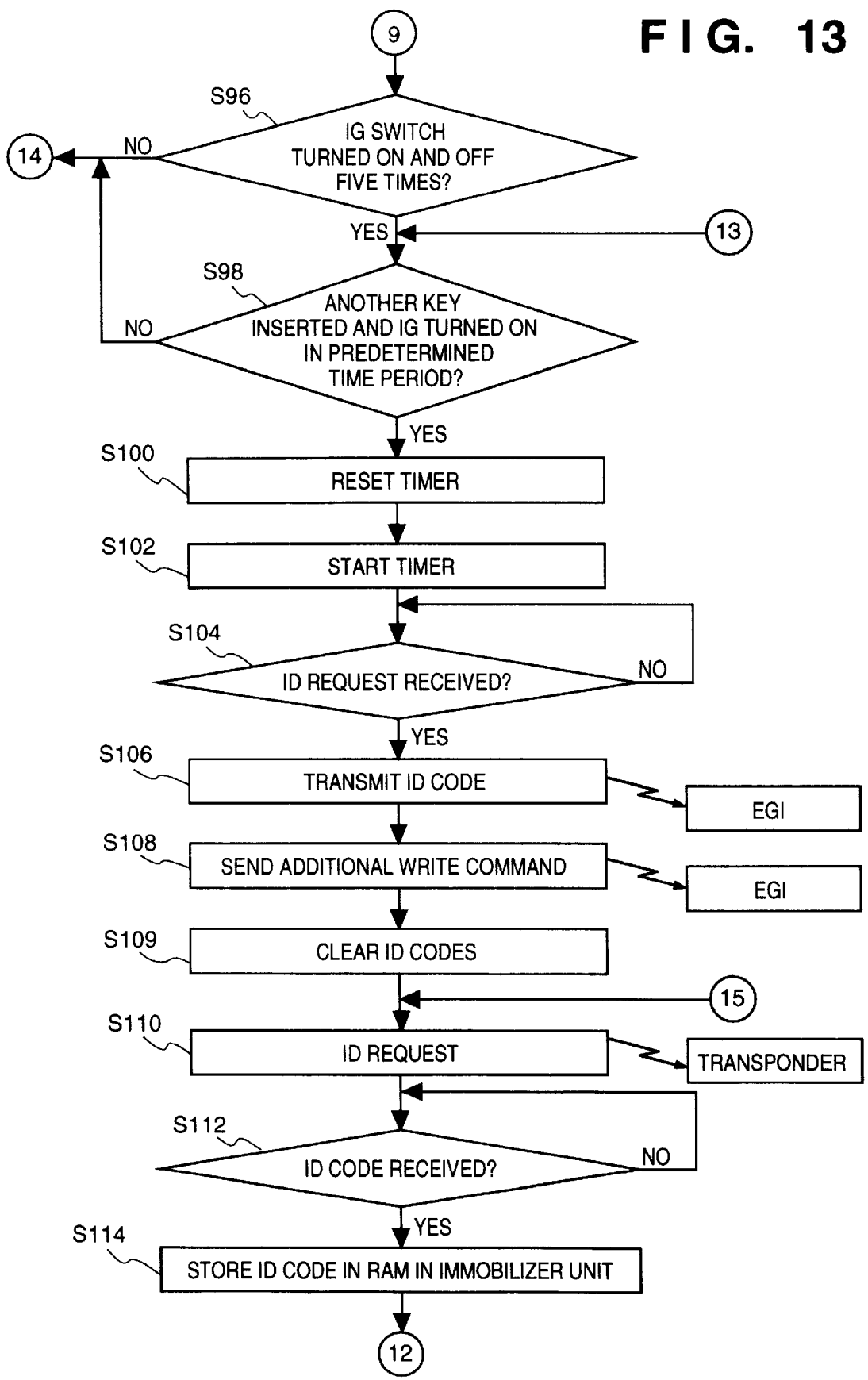
FIG. 13 is a flowchart showing the operational sequence of the additional write process in the immobilizer unit.
Figure 14:
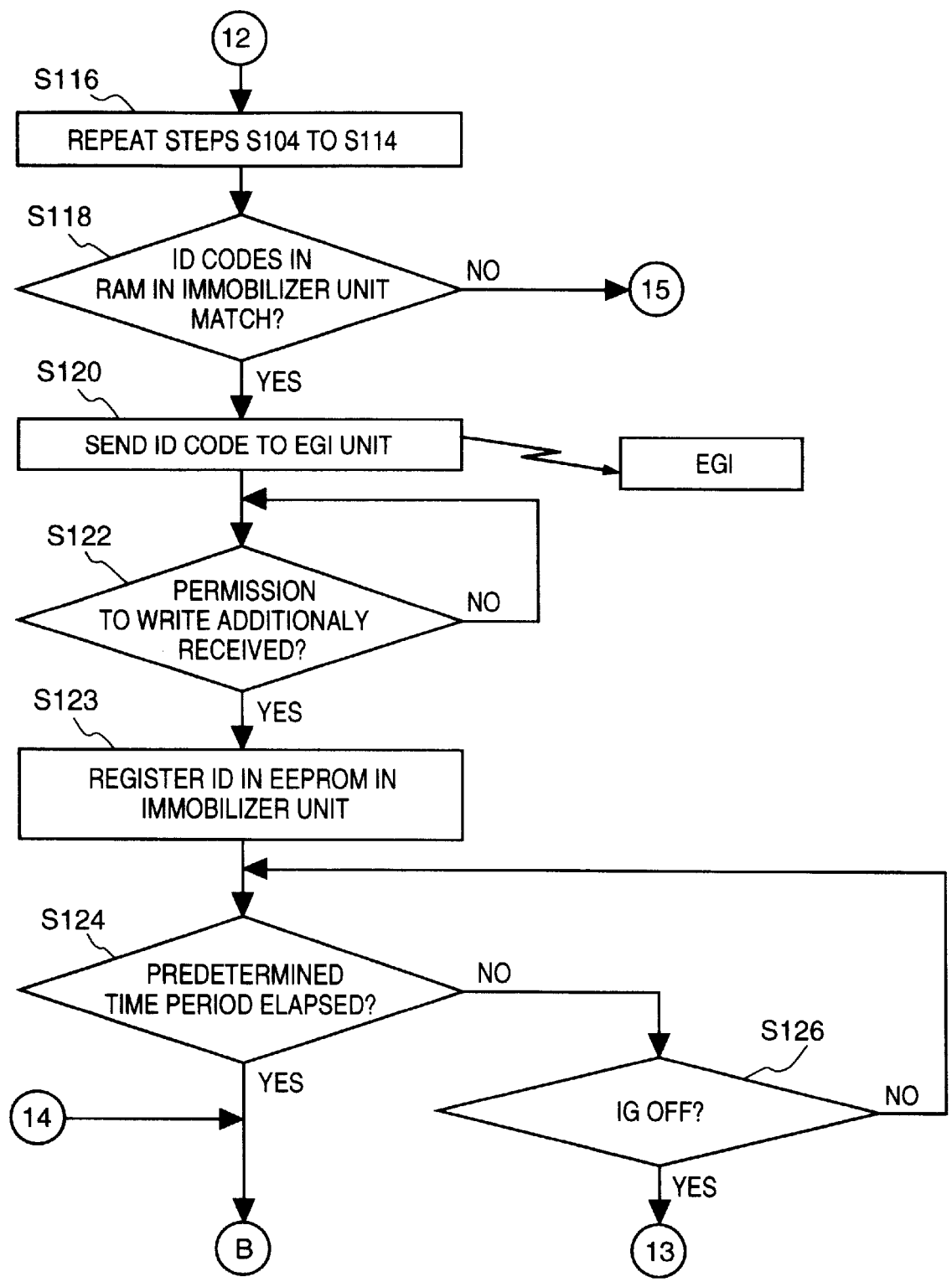
FIG. 14 is a flowchart showing the operational sequence of the additional write process in the immobilizer unit.

Next, an operational sequence of an additional write process in the immobilizer unit will be described. FIGS. 12 through 14 are flowcharts showing the operational sequence of the additional write process in the immobilizer unit. Referring to FIGS. 12 through 14, after the process starts, whether or not the ignition switch is turned ON by using a transponder is determined at step S80. If it is (YES at step S80), the process proceeds to step S82, whereas if it is not (NO at step S80), the process returns to the beginning of this process. At step S82, whether or not predetermined conditions (engine revolution is greater or equal to 500 rpm and voltage is greater or equal to 10 V) are satisfied is determined. If they are (YES at step S82), the process proceeds to step S84, whereas if they are not (NO at step S82), the process returns to the beginning of step S82. At step S84, whether or not the ID request is issued by the EGI unit is judged. If it is (YES at step S84), the process proceeds to step S86, whereas if it is not (NO at step S84), the process returns to the beginning of step S84. At step S86, the immobilizer unit issues an ID request to the transponder, and the process proceeds to step S88. At step S88, whether or not the ID code is responded from the transponder is determined. If it is (YES at step S88), the process proceeds to step S90, whereas if it is not (NO at step S88), the process returns to the beginning of step S88. After the process at step S88 is repeated more than predetermined times or a predetermined time period has elapsed, the immobilizing function is set. At step S90, the immobilizer unit responds to the ID request issued by the EGI unit. Thereafter, the process proceeds to step S92 where the immobilizer unit issues an ID request to the EGI unit. At step S94, whether or not a response indicating that the ID codes match from the EGI unit is received is determined. If it is (YES at step S94), the process proceeds to step S96, whereas if it is not (NO at step S94), the process returns to the beginning of step S94. After the process at step S94 is repeated more than predetermined times or a predetermined time period has elapsed, the immobilizing function is set. At step S96, in correspondence with the response from the EGI unit indicating that the ID codes match, whether or not the ignition switch is turned on and off five times by using the inserted key is determined. If it is (YES at step S96), the process proceeds to step S98, whereas if it is not (NO at step S96), the additional write process for ID codes is not performed and the process returns to step S80. At step S98, the key which made the ignition switch turn on and off five times in a predetermined time period (e.g., about 4 seconds) is pulled off, then another key having a different ID code is inserted in the keyhole, and whether or not the ignition switch is turned on is determined. If it is (YES at step S98), the process proceeds to step S100, whereas if it is not (NO at step S98), the additional write process for ID codes is not performed and the process returns to step S80. Then at step S100, the timer provided in the immobilizer unit is reset and, at step S102, it is started. Thereafter, the process proceeds to step S104 where whether or not an ID request from the EGI unit is received is determined. If it is (YES at step S104), the process proceeds to step S106, whereas if it is not (NO at step S104), the process returns to the beginning of step S104. At step S106, the immobilizer unit sends a response to the ID request issued by the EGI unit, and at step S108, transmits an additional write command to the EGI unit. At step S109, all the ID codes except the ID code of the transponder which is under use are deleted. At step S110, the immobilizer unit transmits the ID request to the transponder in accordance with the ID request by the EGI unit. At step S112, whether or not a response to the ID request transmitted at step S110 is received from the transponder is determined. If it is (YES at step S112), the process proceeds to step S114, whereas if it is not (NO at step S112), the process returns to the beginning of step S112. Thereafter the process proceeds to step S114 where the ID code transmitted from the transponder (other key) is stored in the RAM in the immobilizer unit. Then at step S116, the processes at the previous steps S104 to S114 are repeated once more, two ID codes stored in the RAM are compared. At step S118, whether or not the two ID codes stored in the RAM are identical to each other is determined. If they are (YES at step S118), the process proceeds to step S120, whereas if they are not (NO at step S118) the process goes to step S110. At step S120, the ID code stored in the RAM in the immobilizer unit is sent to the EGI unit. Thereafter at step S122, the EGI unit registers the ID code in the EEPROM and the immobilizer unit determines whether or not it received a response from the EGI unit indicating permission to write additionally is determined. If it has (YES at step S122), the process proceeds to step S123, whereas if it has not (NO at step S112), the process returns to the beginning of step S122. At step S123, the ID code stored in the RAM in the immobilizer unit is registered in the EEPROM. At step S124, whether or not a predetermined time period (e.g., about 5 seconds) has elapsed is determined. If it has (YES at step S124), the process returns to step S80 and the additional write process for another ID code is repeated or the ID code determination is performed. If the predetermined time period has not passed yet (NO at step S124), the process proceeds to step S126 where whether or not the ignition switch is off is determined. If it is (YES at step S126), the process returns to step S98, whereas if it is not (NO at step S126), the process returns to step S124.

<Operational Sequence of an Additional Write Process in the EGI Unit>

Figure 15:
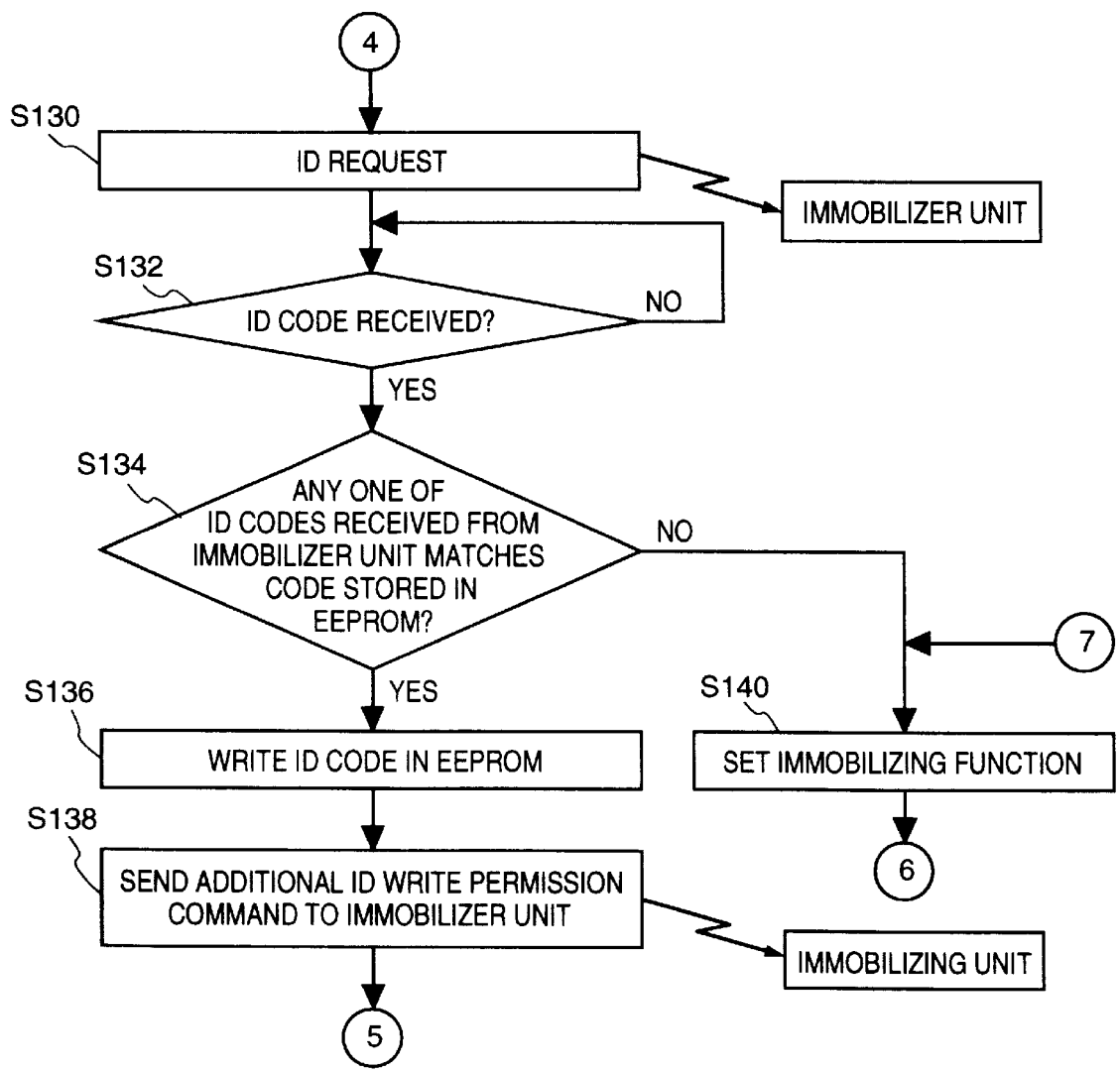
FIG. 15 is a flowchart showing an operational sequence of the additional write process in the EGI unit.

Next, an operational sequence of an additional write process in the EGI unit will be explained. FIG. 15 is a flowchart showing the operational sequence of the additional write process in the EGI unit. Note that steps of the additional write process in the EGI unit is the same as those at steps S40 through S58 in the flowcharts in FIGS. 6 and 7, thus explanation of those processes are omitted. At step S58 in FIG. 7, when the EGI unit received an additional write command (NO at step S58), the process proceeds to step S130 shown in FIG. 15. At step S130, the additional write process starts, and the EGI unit issues an ID request to the immobilizer unit. At step S132, whether or not a response to the ID request which is issued at step S130 is received from the immobilizer unit is determined. If it is (YES at step S132), the process proceeds to step S134, whereas if it is not (NO at step S132), the process returns to the beginning of step S132. At step S134, if there is an ID code, out of one or more ID codes received from the immobilizer unit, which is identical to the ID code registered in the EEPROM is determined. If there is (YES at step S134), the process proceeds to step S136, whereas if there is none (NO at step S134), the process goes to step S140 where the immobilizing function is set, and then the process returns to step S40 in FIG. 6. At step S136, a new ID code is registered in the EEPROM in the EGI unit. The new ID code at step S136 is that an ID code other than the codes which are identical to the codes registered in the EEPROM, which is judged at step S134. Thereafter at step S138, an additional write permission command for an ID code is sent to the immobilizer unit. Then the process goes to step S62 in FIG. 7, and the subsequent processes are the same as those explained with reference to FIGS. 6 and 7.

By performing the aforesaid operational sequence, ID codes are additionally written to the immobilizer unit and the EGI unit. It should be noted that the processes subsequent to step S50 in FIG. 6 and the processes subsequent to step S104 in FIG. 13 are synchronized between the units.

Figure 16:
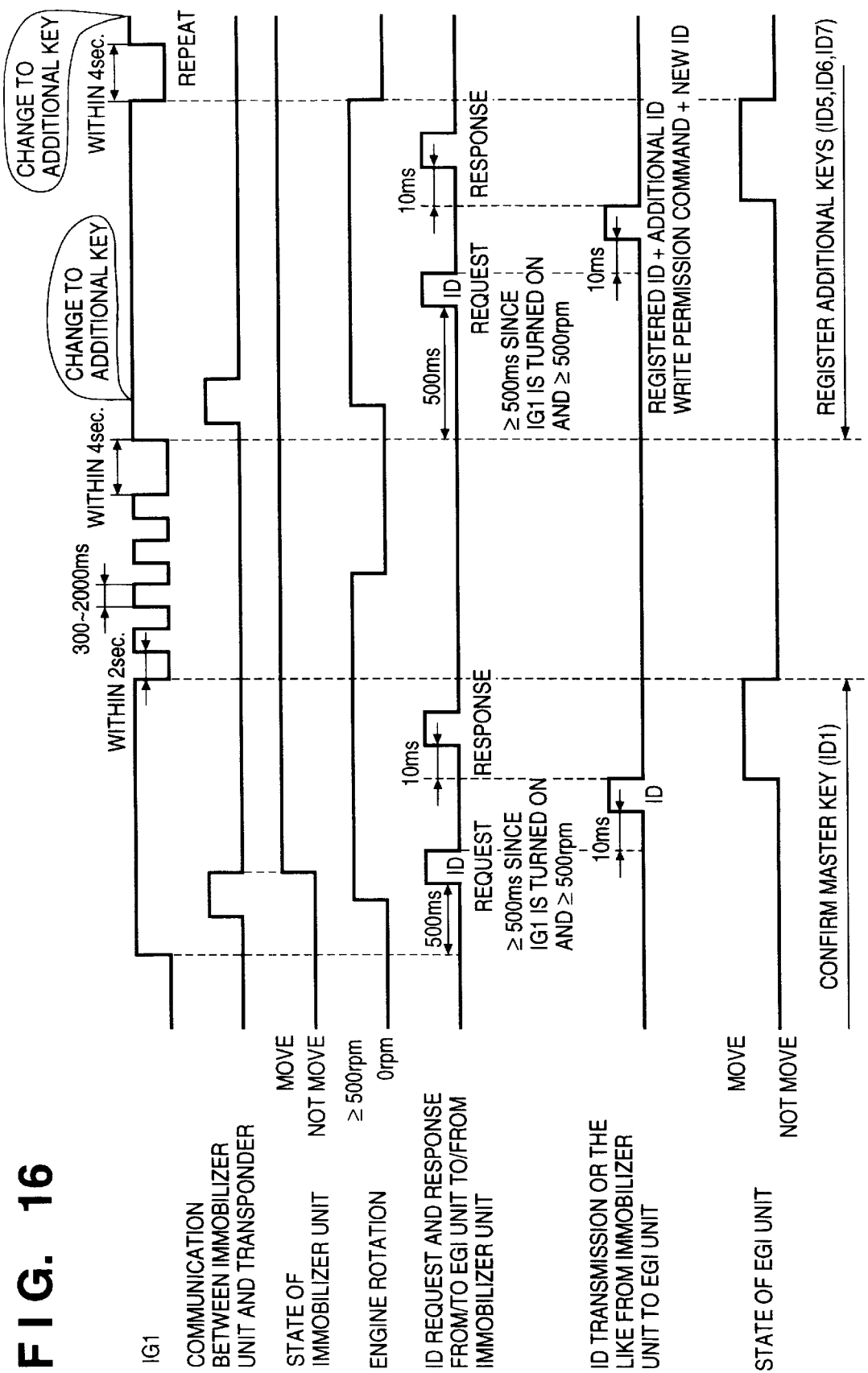
FIG. 16 is a timing chart of each operation in the transponder, the ignition switch, the immobilizer unit, and the EGI unit in the operation for adding a registration of a key (changing ID codes, additional writing).
Figure 4:
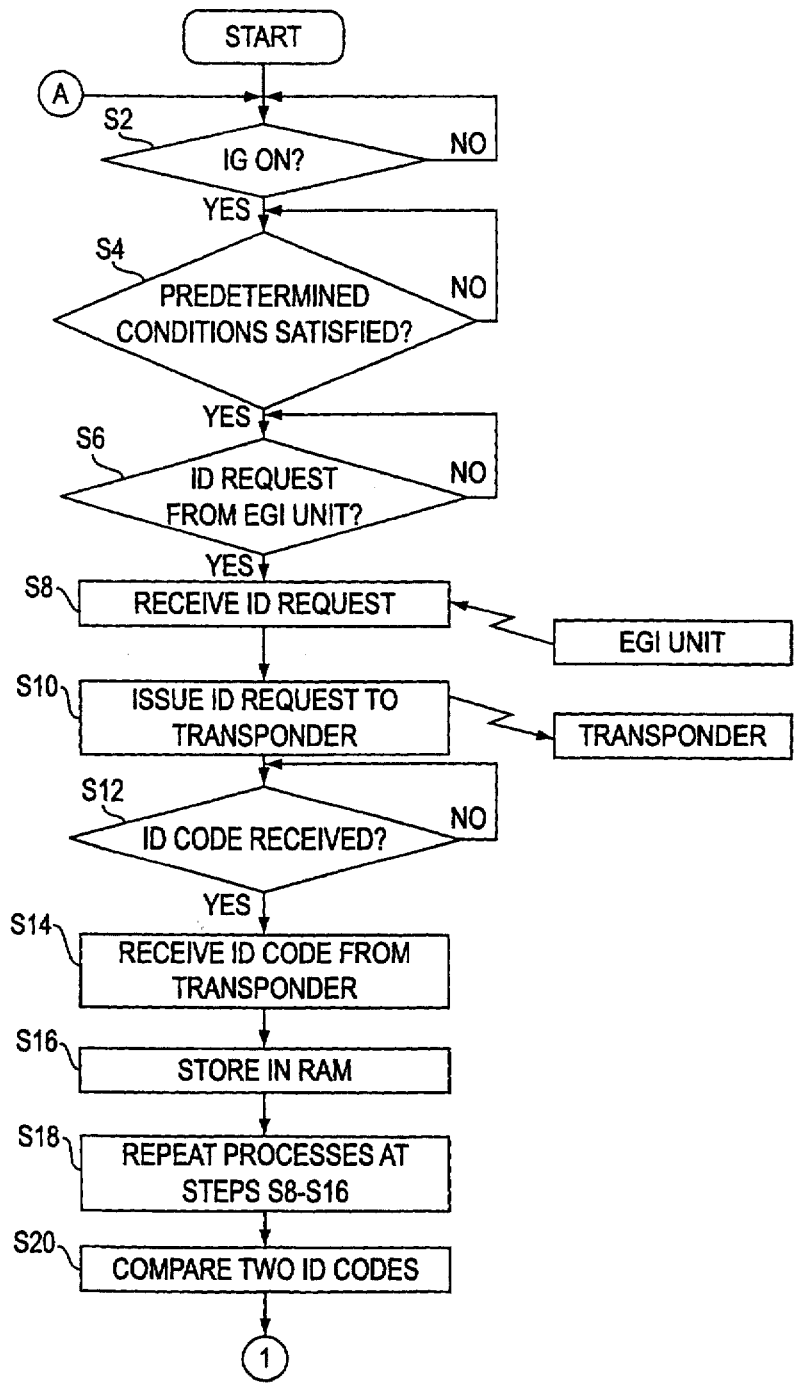
Figure 4:
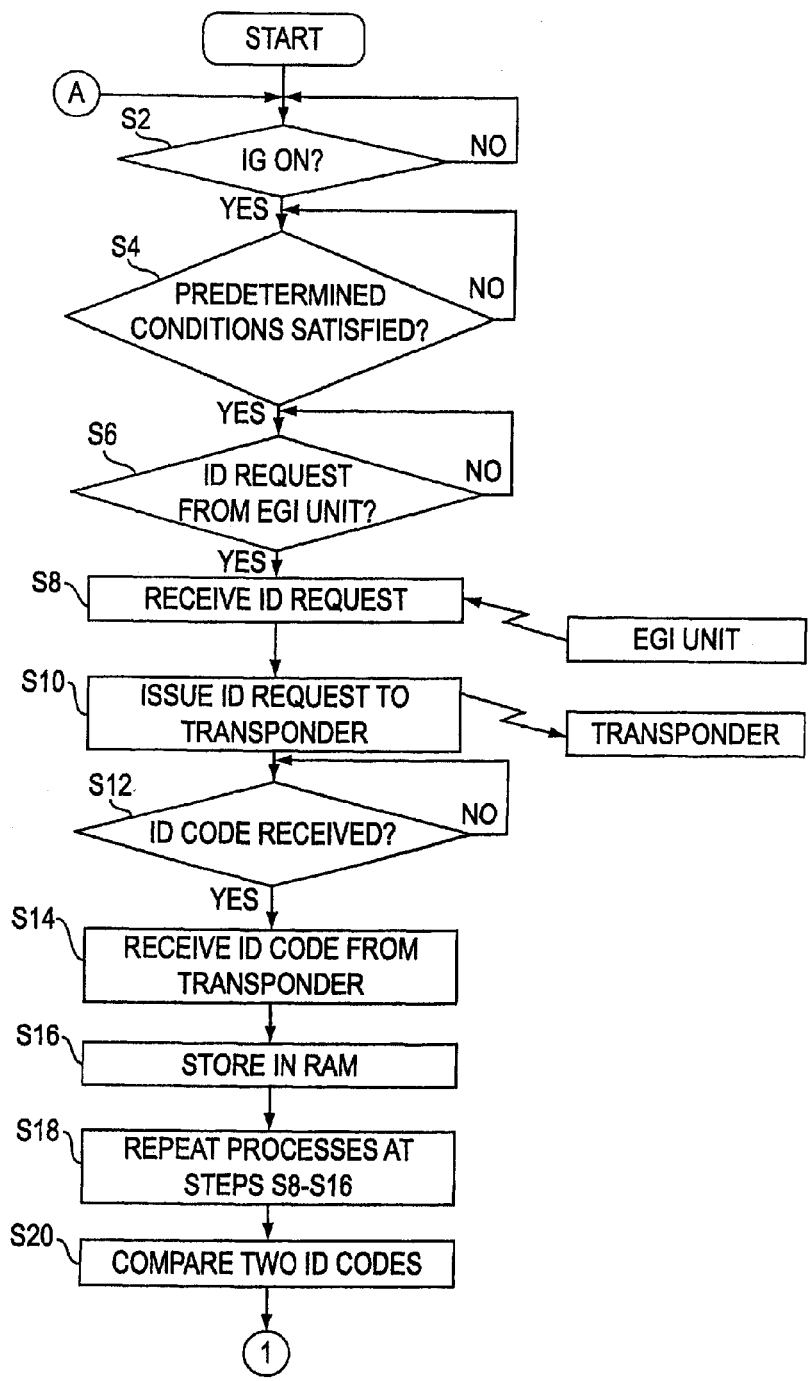
Figure 5:
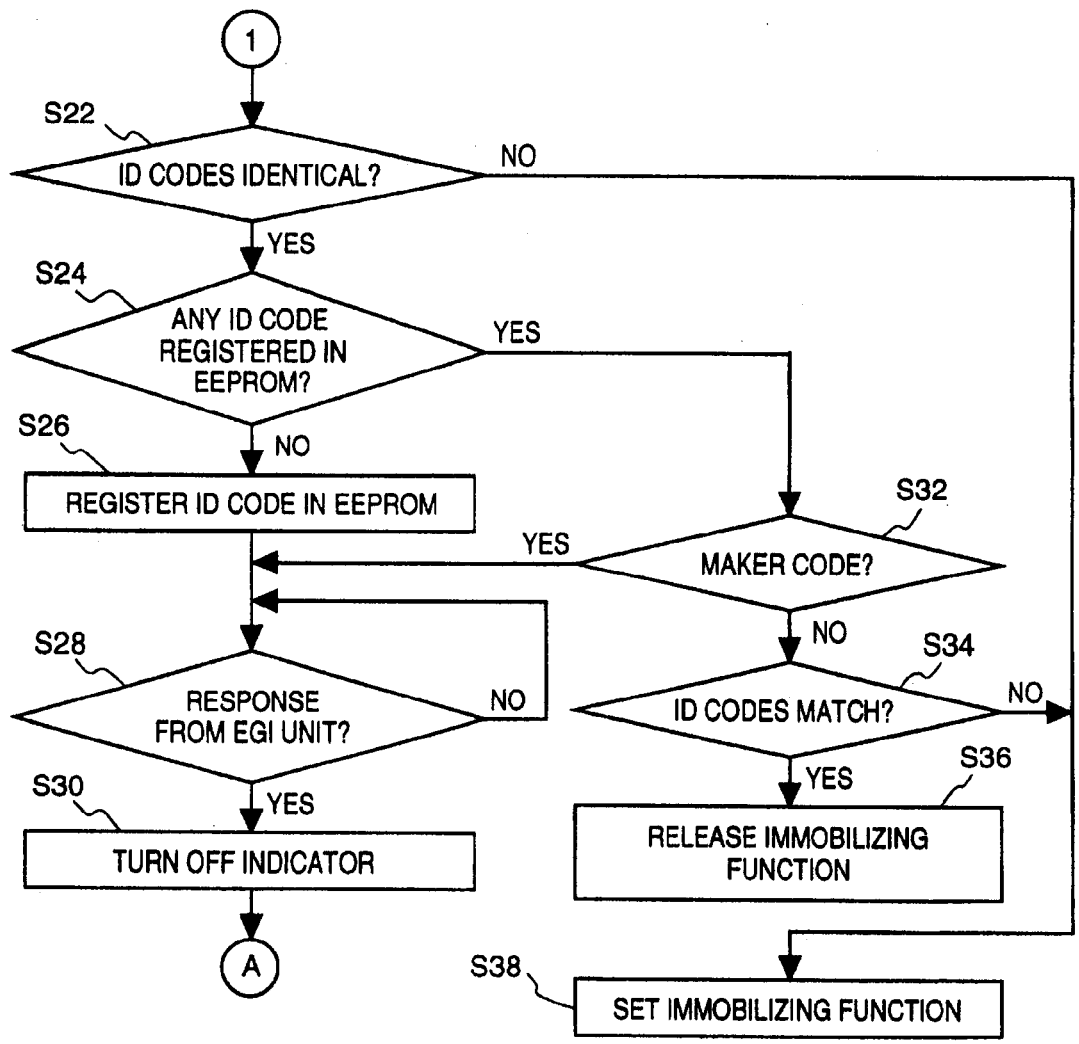
Figure 6:
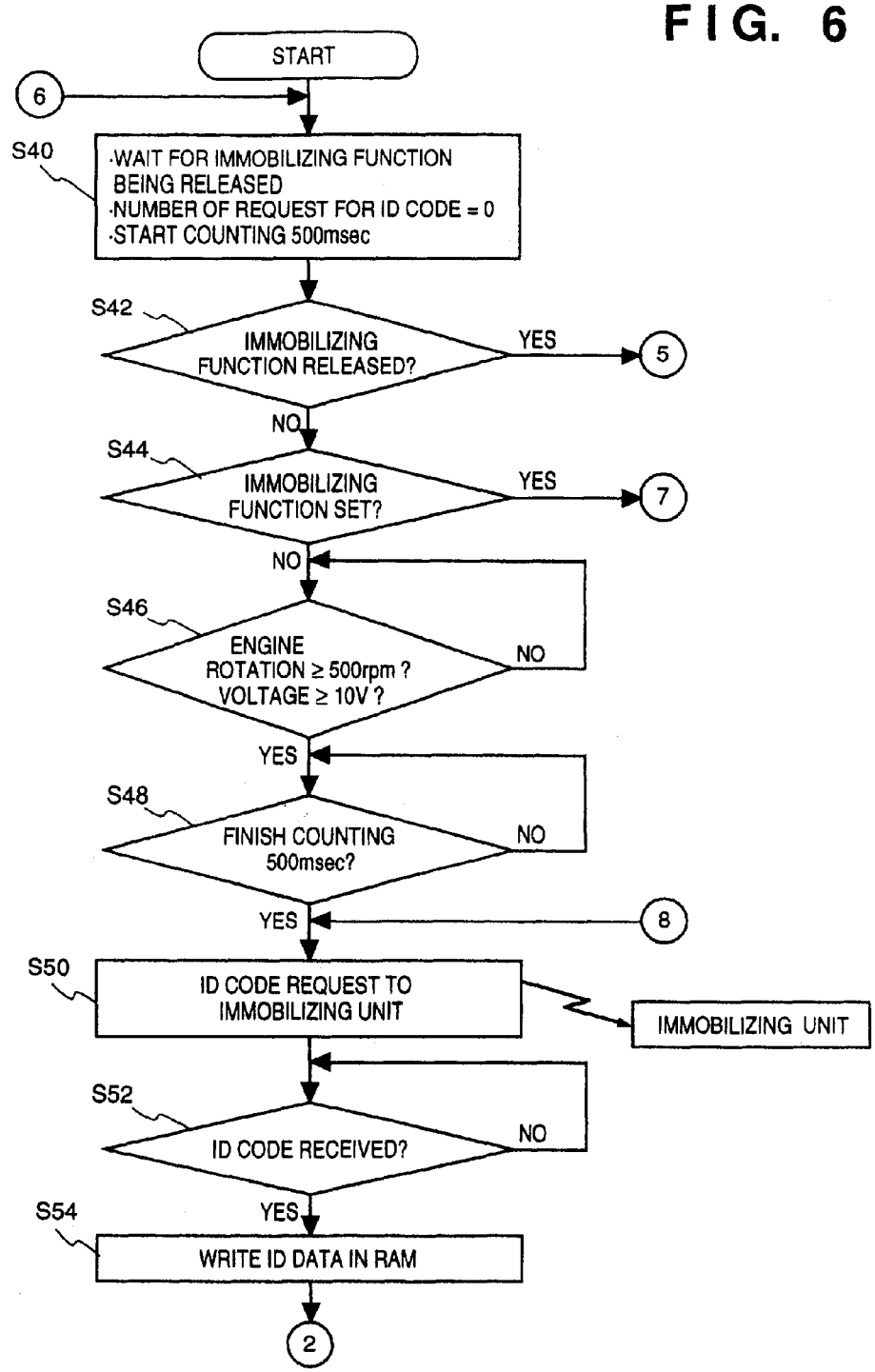
Figure 7:
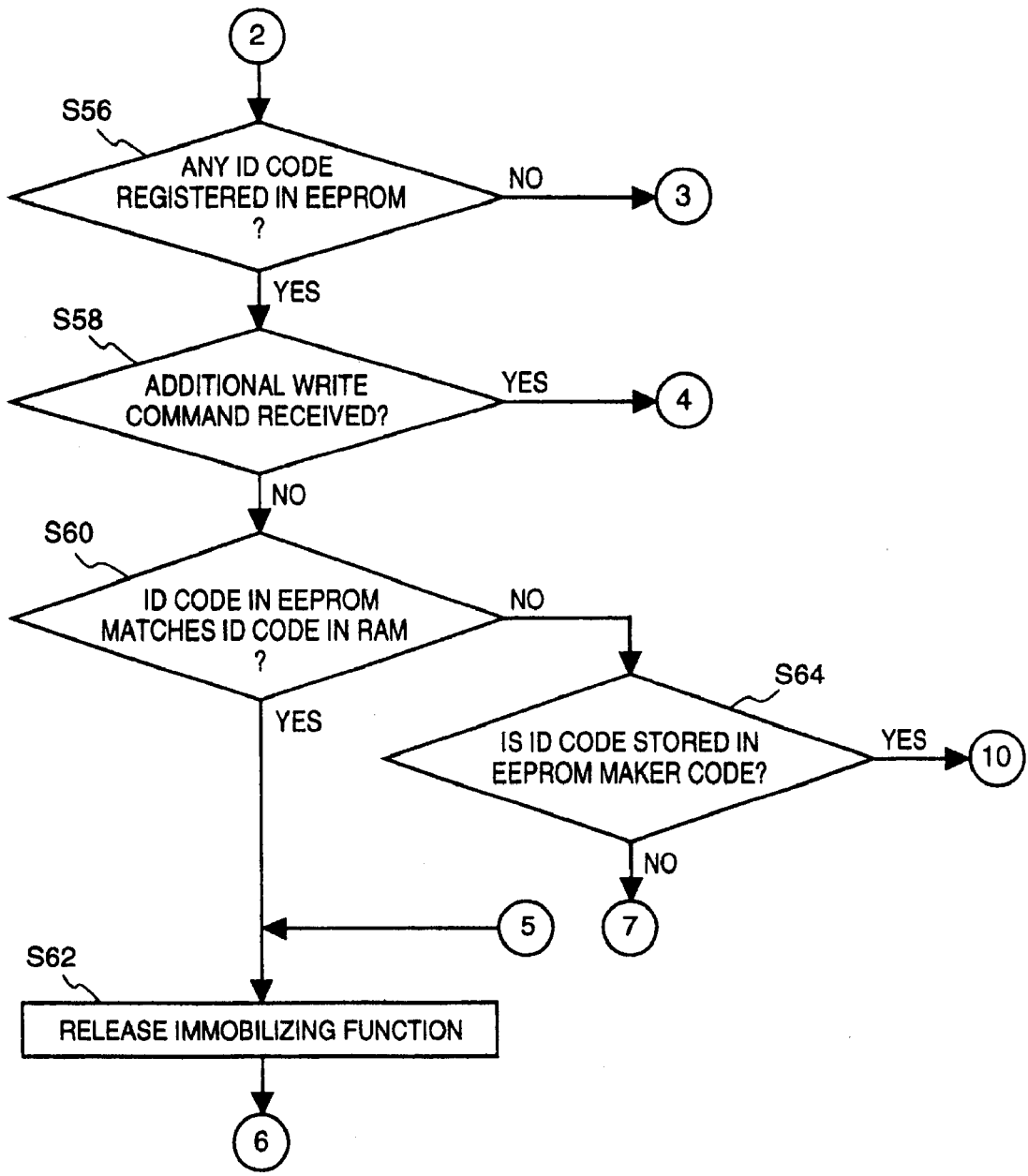
Figure 8:
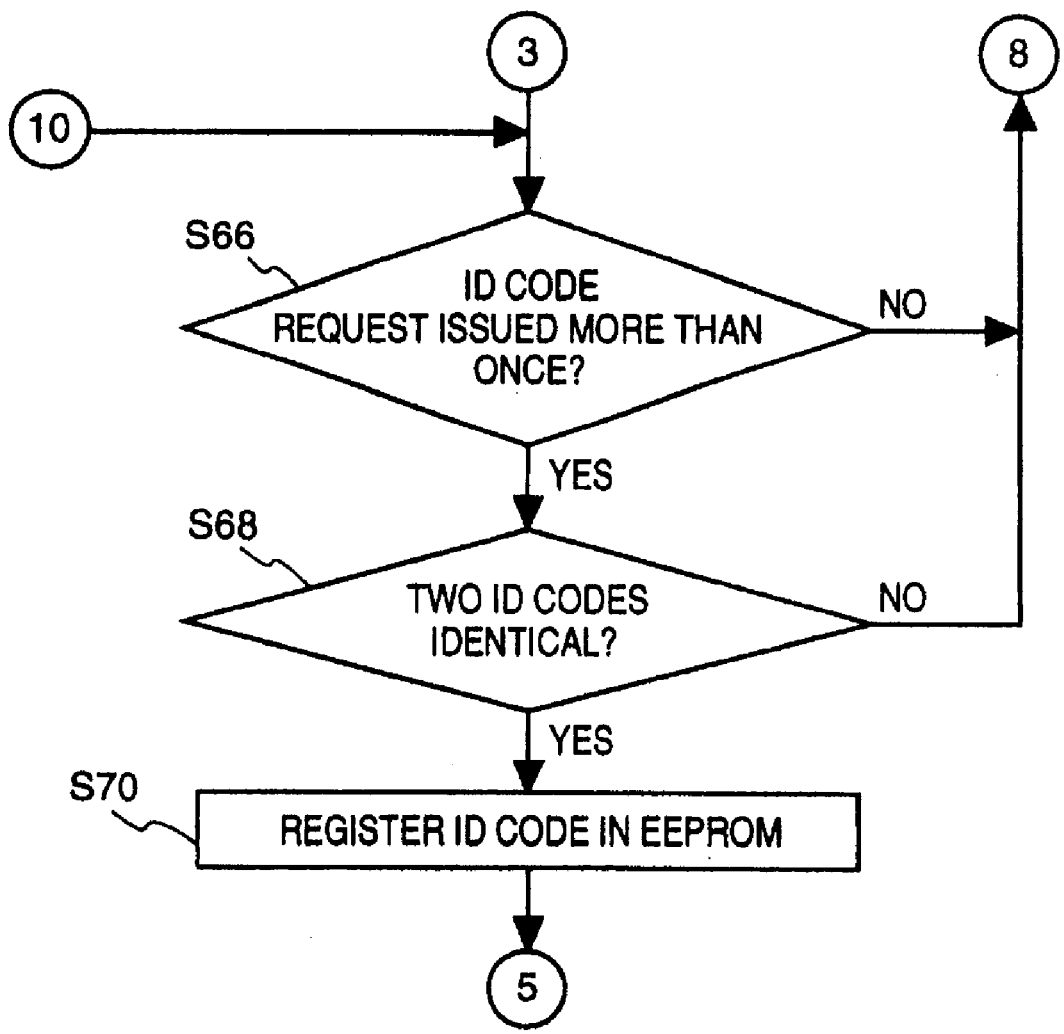
Figure 11:
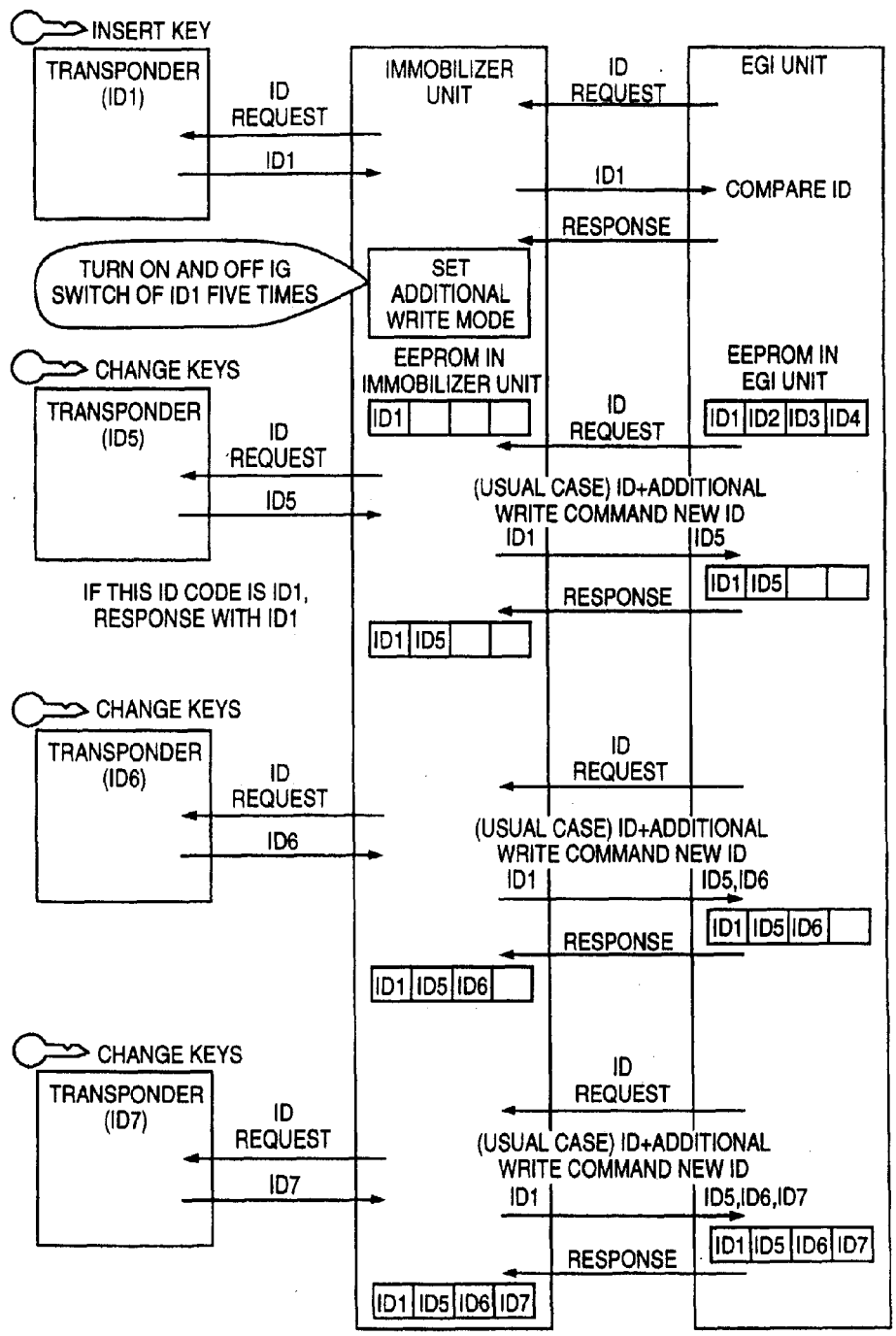
Figure 13:
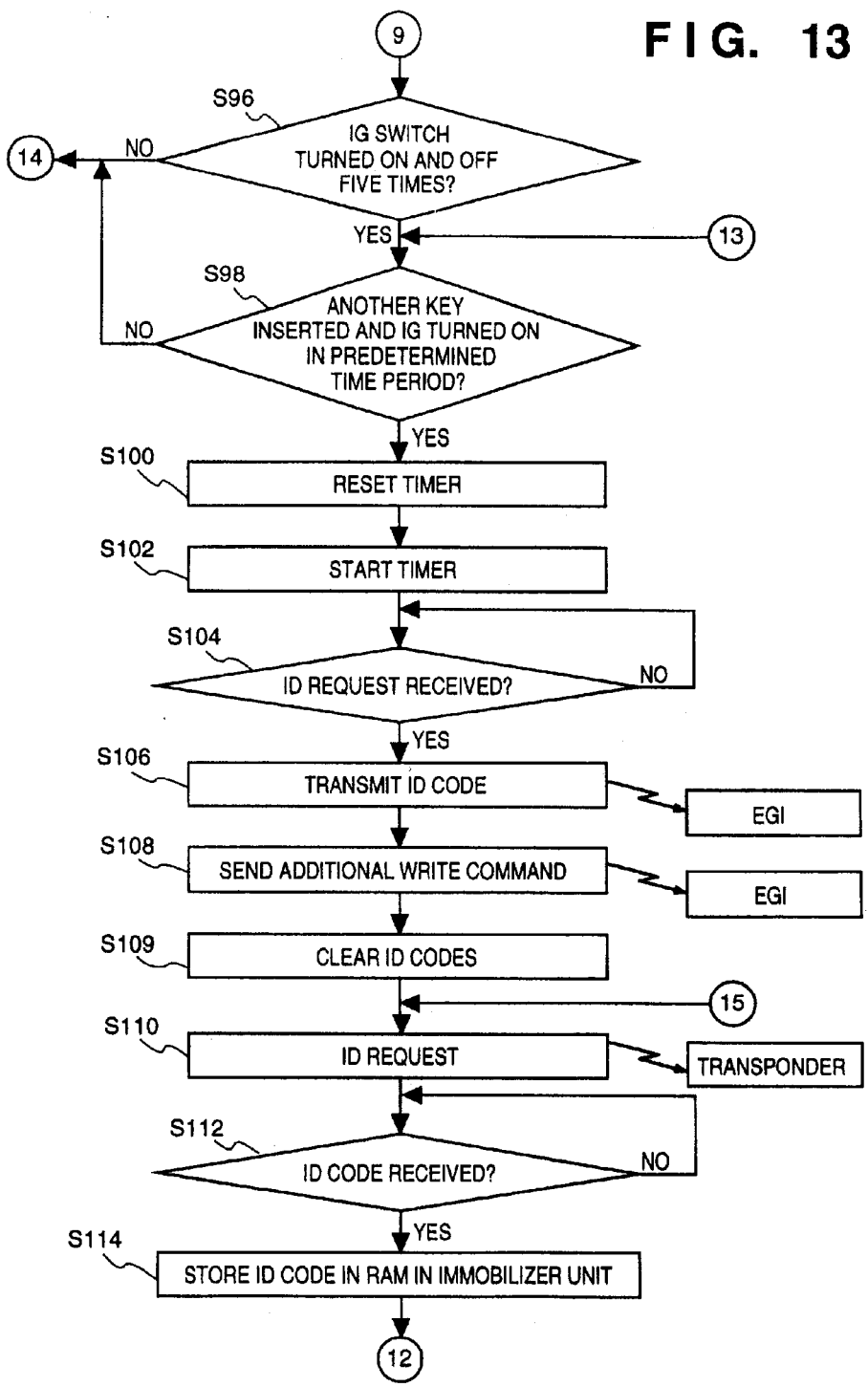
Figure 14:
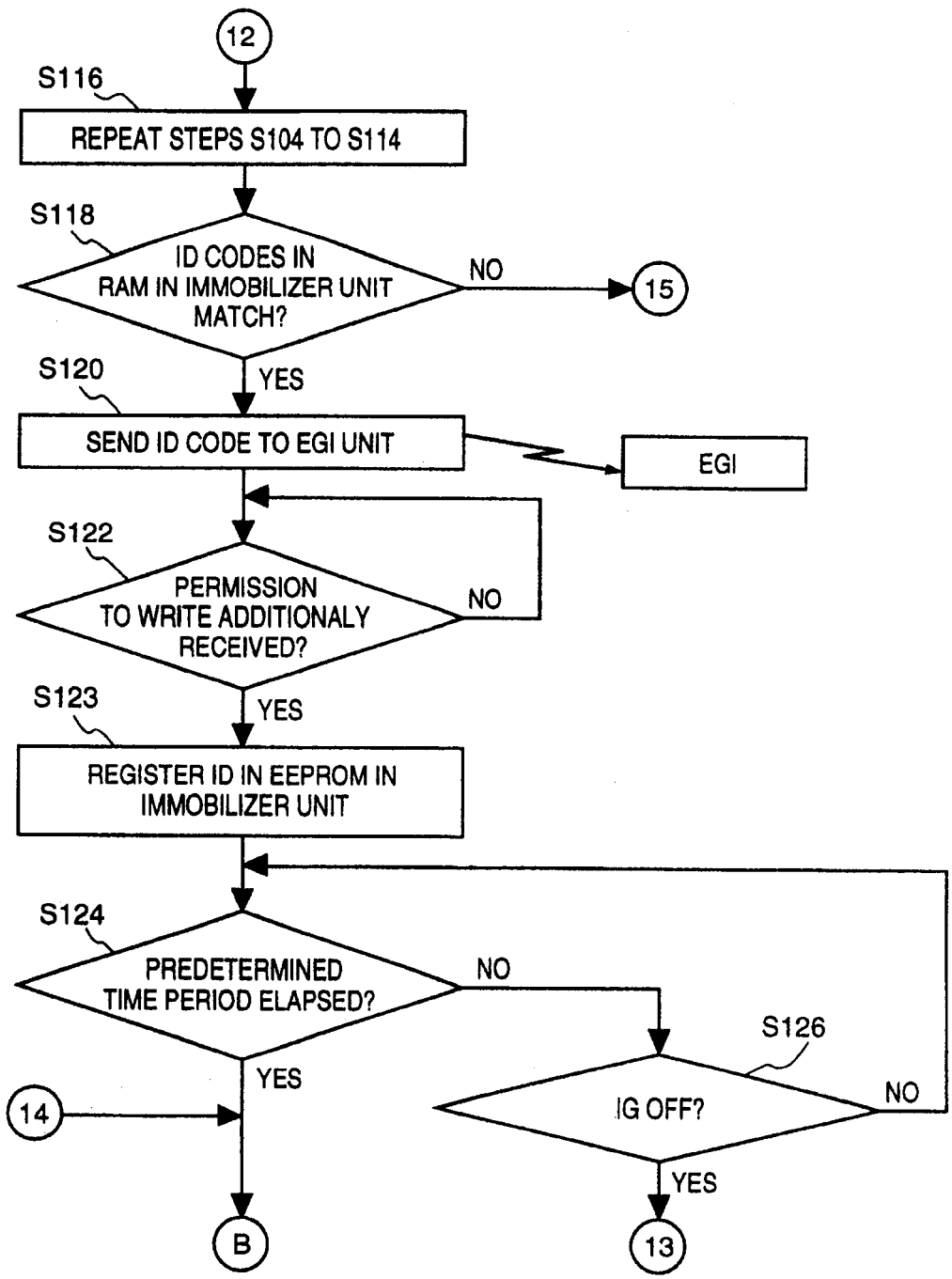
Figure 15:
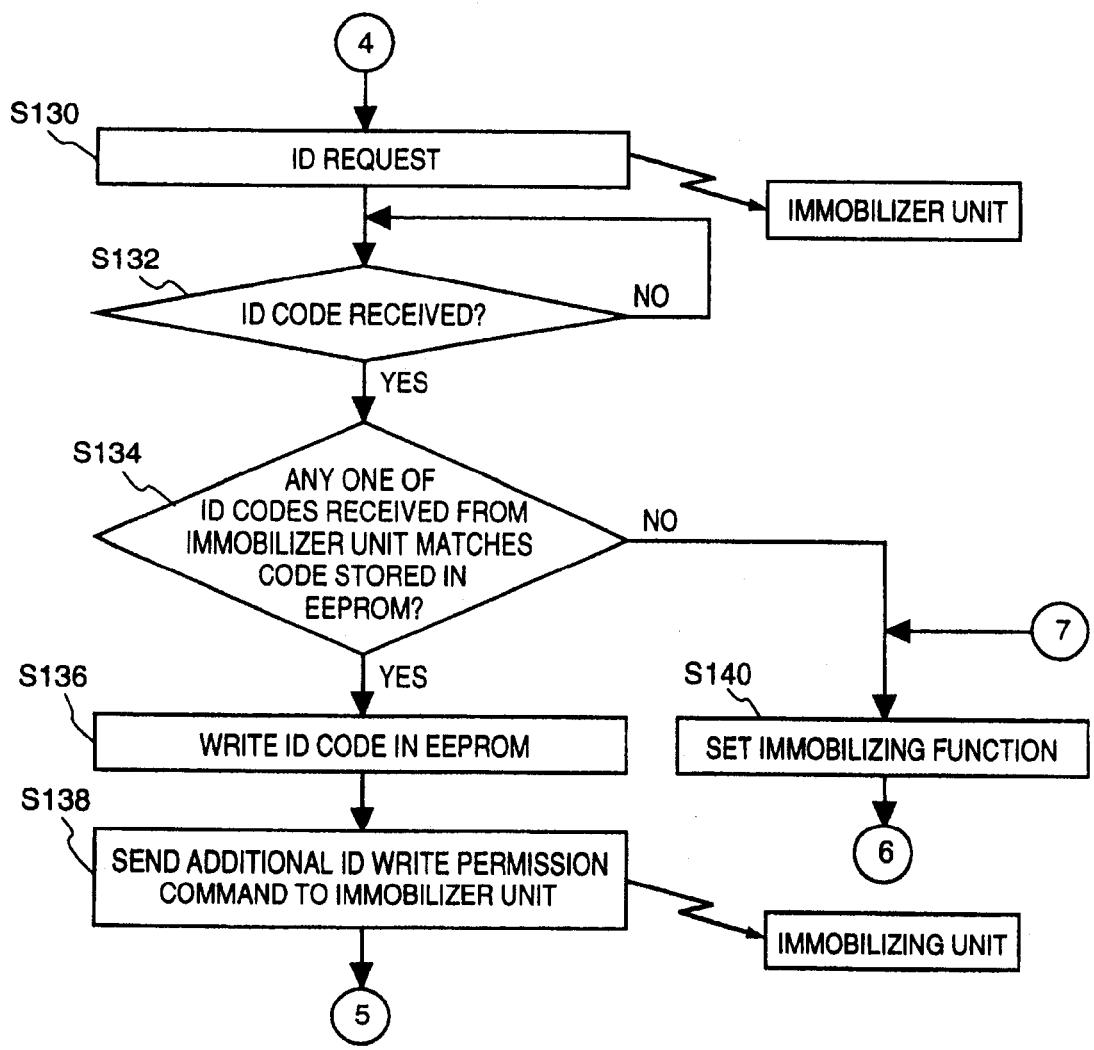

FIG. 16 is a timing chart of each operation in the transponder, the ignition switch, the immobilizer unit, and the EGI unit in the operation for adding keys (updating ID code, additionally writing). As shown in FIG. 16, timing of ON and OFF of the ignition switch described with reference to FIGS. 12 to 14 is about 2 seconds. This ON and OFF operation is repeated five times and keys in the keyhole are changed in 4 seconds.

Effects of the Invention

As described above, ID codes which are specific to each key are stored in the EEPROM only when the ID code stored in the RAMs in the immobilizer unit and the EGI unit satisfies predetermined conditions, thus setting of the codes specific to each key can be easily performed.

Further, after each unit of the anti-vehicle-thief apparatus of the present invention has been tested by using predetermined codes in an assembly factory, for instance, the codes can be easily changed to other specific codes at a dealer and the like.

Furthermore, since the additional write mode is provided, even if a key or keys are lost, by preparing new key or keys, deleting the ID code or codes of the lost key or keys, and registering new ID code or codes, it is possible to prevent a vehicle from being stolen with the use of the lost key or keys.

The present invention is not limited to the above embodiment and various changes and modifications can be made within the spirit and scope of the present invention.

For example, the anti-vehicle-thief apparatus according to the above embodiment is realized by both the immobilizer unit and the EGI unit. However, a system which performs ID code determination using either one of above units may be constructed. Further, the immobilizer unit and the EGI unit may be combined to form a single unit.

Further, in the above embodiment, the four ID codes are registered for the ID code determination and used for the additional write process; however the number of the ID code to be used is not limited to four.

Furthermore, predetermined time periods for the id code determination and for setting to the changing mode can be arbitrarily set.

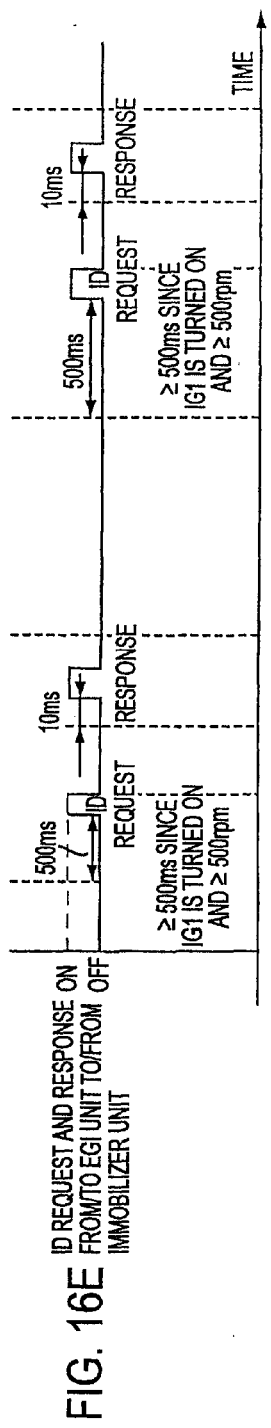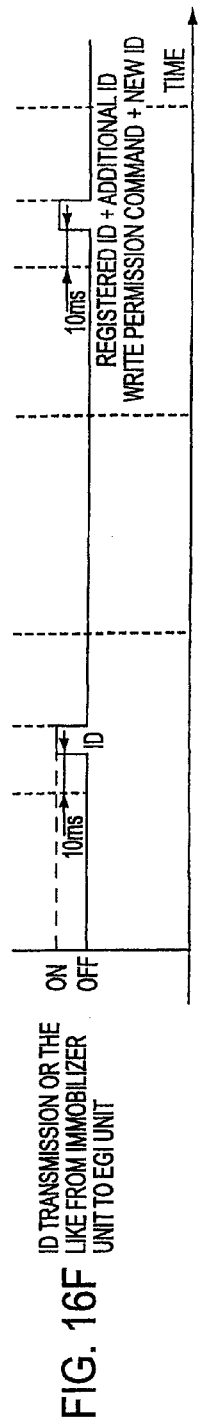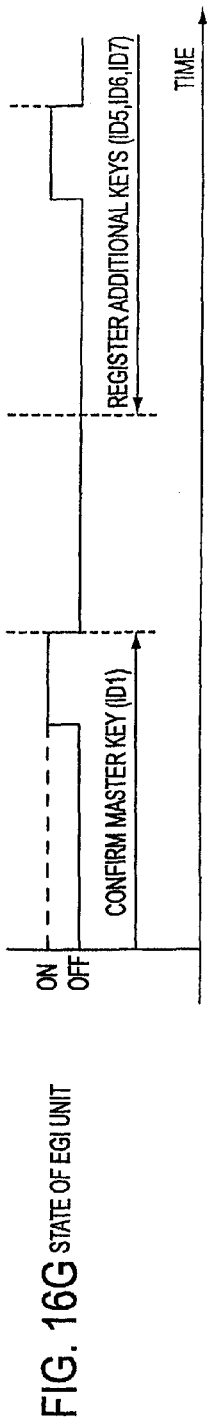

What is claimed is:

1. An anti-vehicle-thief apparatus comprising:
a plurality of keys having specific codes, and
engine controlling means,
wherein said engine controlling means performs initial settings of said specific codes by including
storage means having an area for storing said codes specific to each of said plurality of keys, and
controlling means for controlling so as to store inputted codes specific to each of said plurality of keys in said area of said storage means when data having been stored in said area satisfies predetermined conditions,
wherein electricity is supplied from a power supply to said engine controlling means when an ignition switch is on and said controlling means comprises judging means for judging whether of not voltage of the power supply for said engine controlling means is stable, and stores said codes specific to each of said plurality of keys in said area only when the voltage is stable.

2. An anti-vehicle-thief apparatus comprising:
(a) first code storage means for storing a specific first code;
(b) a first key having a specific second code;
(c) a second key having a specific third code which is different from said specific first and second codes;
(d) first detection means for detecting whether or not an operation switch is turned on by using said first key;
(e) code reading means for reading said specific second code from said first key when the operation switch is turned on by using said first key;
(f) first code comparison means for comparing said specific first code stored in said first code storage means with said specific second code read by said code reading means;
(g) determination means for determining whether said first key is valid where said specific second code is identical to said specific first, or invalid where said specific second code is not identical to said specific first code;
(h) second detection means for detecting whether or not the operation switch is turned on and off predetermined times by using said first key which is valid;
(i) code registration means for registering said specific third code additionally with said first code storage means when the operation switch is turned on by using said second key after detecting that the operation switch is turned on and off the predetermined times by using said first key;
(j) engine revolution detection means for detecting engine revolution;
(k) voltage detection means for detecting voltage of power supply; and
(l) means for prohibiting code registration by said code registration means when the engine revolution and the voltage is lower than a predetermined value.

3. A code setting method of an anti-vehicle-thief apparatus including first code storage means for storing a specific first code; a first key having a specific second code; a second key having a specific third code which is different from said specific first and second codes; first detection means for detecting whether or not an operation switch is turned on by using said first key; code reading means for reading said specific second code from said first key when the operation switch is turned on by using said first key; first code comparison means for comparing said specific first code stored in said first code storage means with said specific second code read by said code reading means; and determination means for determining whether said first key is valid where said specific second code is identical to said specific first code, or invalid where said specific second code is not identical to said specific first code, the method comprising:
(a) a first detection step of detecting whether or not the operation switch is turned on by using said first key;
(b) a comparison step of comparing said specific first code stored in said first code storage means with said specific second code read by said code reading means;
(c) a second detection step of detecting whether or not the operation switch is turned on and off predetermined times by using said first key;
(d) a third detection step of detecting whether or not the operation switch is turned on by using said second key;
(e) a registration step of registering said specific third code additionally with said first code storage means when the operation switch is turned on by using said second key after detecting that the operation switch is turned on and off the predetermined times by using said first key;
(f) an engine revolution detection step of detecting engine revolution;
(g) a voltage detection step of detecting voltage of a power supply; and
(h) a code registration prohibition step of prohibiting code registration when the engine revolution and the voltage is lower than a predetermined value.

4. An anti-vehicle-thief apparatus, comprising:
(a) first code storage means for storing a plurality of codes including a specific first code;
(b) a first key having a specific second code;
(c) a second key having a specific third code which is different from said specific first code and said specific second code;
(d) first detection means for detecting whether or not an operation switch is turned on by using said first key;
(e) code reading means for reading said specific second code from said first key when the operation switch is turned on by using said first key;

(f) first code comparison means for comparing said specific first code stored in said first code storage means with said specific second code read by said code reading means;

(g) first determination means for determining whether said first key is valid where said specific second code is identical to said specific first code, or invalid where said specific second code is not identical to said specific first code;

(h) second detection means for detecting whether or not the operation switch is turned on and off a predetermined plurality of times by using said first key which is valid; and (i) first code registration means for registering said specific third code additionally with said first code storage means when the operation switch is turned on by using said second key after detecting that the operation switch is turned on and off the predetermined plurality of times by using said first key which is valid, wherein said first code storage means clears the other codes which have been already registered, except for said specific first code which is identical to said specific second code, when said first detection means detects that the operation switch is turned on and off the predetermined plurality of times by using said first key which is valid.

5. A code setting method of anti-vehicle-thief apparatus including first code storage means for storing a plurality of codes including a specific first code; a first key having a specific second code; a second key having a specific third code which is different from said specific first code and said specific second code; first detection means for detecting whether or not an operation switch is turned on by using said first key; code reading means for reading said specific second code from said first key when the operation switch is turned on by using said first key; first code comparison means for comparing said specific first code stored in said first code storage means with said specific second code read by said code reading means; and first determination means for determining whether said first key is valid where said specific second code is identical to said specific first code, or invalid where said specific second code is not identical to said specific first code; comprising:

(a) a first detection step of detecting whether or not the operation switch is turned on by using said first key;

(b) a comparison step of comparing said specific first code stored in said first code storage means with said specific second code read by said code reading means;

(c) a second detection step of detecting whether or not the operation switch is turned on and off a predetermined plurality of times by using said first key;

(d) a third detection step of detecting whether or not the operation switch is turned on by using said second key;

(e) a registration step of registering said specific third code additionally with said first code storage means when the operation switch is turned on by using said second key after detecting that the operation switch is turned on and off the predetermined plurality of times by using said first key which is valid; and (f) a code clearing step of clearing the other codes which have been already registered, except for said specific first code which is identical to said specific second code, when said first detection means detects that the operation switch is turned on and off the predetermined plurality of times by using said first key which is valid.

6. An anti-vehicle-thief apparatus comprising:
a plurality of keys having specific codes; and
determination means for determining validity of keys,
wherein said determination means performs initial settings of said specific codes by including:
storage means having an area for storing said codes specific to each of said plurality of keys, and
controlling means for controlling so as to store inputted codes specific to each of said plurality of keys in said area of said storage means when said area of said determination means is in an initialized state,
wherein electricity is supplied to said determination means directly from a power supply and said controlling means comprises judging means for judging whether or not voltage of the power supply for said determination means is stable, and stores said codes specific to each of said plurality of keys in said area only during a period when the voltage is stable.

7. The anti-vehicle-thief apparatus according to claim 6, further comprising:
engine controlling means,
wherein said determination means and said engine controlling means perform initial settings of said specific codes by including
respective storage means having areas for storing said codes specific to each of said plurality of keys; and
respective controlling means for controlling so as to store inputted codes specific to said keys in said areas of said respective storage means when data having been stored in said areas satisfy predetermined conditions,
wherein electricity is supplied to said determination means directly from a power supply, and electricity is supplied from a power supply to said engine controlling means during a period when an ignition switch is on, and
wherein said respective controlling means comprise judging means for judging whether or not voltage of the respective power supply for said determination means and said engine controlling means are stable, and store said codes specific to each of said plurality of keys in said respective areas only when the voltages are stable.

8. A code setting method of anti-vehicle-thief apparatus including first code storage means for storing a specific first code; a first key having a specific second code; a second key having a specific third code which is different from said specific first and second codes; first detection means for detecting whether or not an operation switch is turned on by using said first key; code reading means for reading said specific second code from said first key when the operation switch is turned on by using said first key; first code comparison means for comparing said specific first code stored in said first code storage means with said specific second code read by said code reading means; and first determination means for determining whether said first key is valid where said specific second code is identical to said specific first, or invalid where said specific second code is not identical to said specific first code; comprising:

(a) a first detection step of detecting whether or not the operation switch is turned on by using said first key;

(b) a comparison step of comparing said specific first code stored in said first code storage means with said specific second code read by said code reading means;

(c) a second detection step of detecting whether or not the operation switch is turned on and off a predetermined plurality of times by using said first key;

(d) a third detection step of detecting whether or not the operation switch is turned on by using said second key;

(e) a registration step of registering said specific third code with said first code storage means when the operation switch is turned on by using said second key after detecting that the operation switch is turned on and off the predetermined plurality of times by using said first key which is valid;

wherein the anti-vehicle-thief apparatus includes engine control means for causing an engine to stop when said determination means determines that said first key is invalid, and said engine control means includes second code storage means for storing said specific first code, and second code comparison means for comparing said specific first code with said specific second code.

9. The code setting method as recited in claim 8, wherein said specific third code is registered with said first and second code storage means simultaneously.

10. The code setting method as recited in claim 9, wherein said specific third code is registered if the operation switch is turned on by using said second key within a predetermined time period after detecting that an operation switch is turned on and off the predetermined plurality of times.

11. The code setting method as recited in claim 9, further comprising;

a code clearing step of clearing the other codes which have been already registered, except for said specific first code, when said first detection means detects that the operation switch is turned on and off the predetermined plurality of times.

12. The code setting method as recited in claim 9, wherein said specific third code is transmitted to said engine control means and registered with said second code storage means.

13. A code setting method of anti-vehicle-thief apparatus including first code storage means for storing a specific first code; a first key having a specific second code; a second key having a specific third code which is different from said specific first and second codes; first detection means for detecting whether or not an operation switch is turned on by using said first key; code reading means for reading said specific second code from said first key when the operation switch is turned on by using said first key; first code comparison means for comparing said specific first code stored in said first code storage means with said specific second code read by said code reading means; and first determination means for determining whether said first key is valid where said specific second code is identical to said specific first, or invalid where said specific second code is not identical to said specific first code; comprising:

(a) a first detection step of detecting whether or not the operation switch is turned on by using said first key;

(b) a comparison step of comparing said specific first code stored in said first code storage means with said specific second code read by said code reading means, (c) a second detection step of detecting whether or not the operation switch is turned on and off a predetermine plurality of times by using said first key;

(d) a third detection step of detecting whether or not the operation switch is turned on by using said second key;

(e) a registration step of registering said specific third code with said first code storage means when the operation switch is turned on by using said second key within a predetermined time period after the second detection step detects that the operation switch is turned on and off the predetermined plurality of times by using said first key; and (f) a fourth detection step of detecting whether or not the operation switch is turned on by using a third key within a predetermined time period after said second key is pulled out of the operation switch after said specific third code has been registered in said first code storage means, wherein, at the registration step, a specific fourth code is registered if the operation switch is turned on by using said third key within the predetermined time period, said third key having the specific fourth code which is different from said specific first, second, and third codes.

14. The code setting method as recited in claim 13, wherein the anti-vehicle-thief apparatus includes engine control means for causing an engine to stop when said determination means determines that said first key is invalid.

15. The code setting method according to claim 13, further comprising code registration prohibition step of prohibiting code registration at said registration step if the operation switch is not turned on by using said second key within a predetermined time period after the second detection step detects that the operation switch is turned on and off the predetermined plurality of times.

16. The code setting method as recited in claim 13, wherein said code reading means reads said specific second code a plurality of times, and said third detection step includes a step of checking whether or not specific second codes read by said code reading means the plurality of times are identical with each other, and prohibiting code registration at said registration step if specific second codes read by said code reading means are not identical with each other.

17. The code setting method of anti-vehicle-thief apparatus according to claim 13, wherein when the operation switch is not turned on by using said third key within the predetermined time period, said first code registration means do not register said specific fourth code even if the operation switch is turned on by using said third key after the predetermined time period passes.

18. An anti-vehicle-thief apparatus, comprising:

(a) a first code storage means for storing a specific first code;

(b) a first key having a specific second code;

(c) a second key having a specific third code which is different from said specific first and second codes;

(d) first detection means for detecting whether or not an operation switch is turned on by using said first key;

(e) code reading means for reading said specific second code from said first key when the operation switch is turned on;

(f) first code comparison means for comparing said specific first code stored in said first code storage means with said specific second code read by said code reading means;

(g) first determination means for determining whether said first key is valid where said specific second code is identical to said specific first code, or invalid where said specific second code is not identical to said specific first code;

(h) second detection means for detecting whether or not the operation switch is turned on and off a predetermined plurality of times by using said first key which is valid;

(i) first code registration means for registering said specific third code with said first code storage means when the operation switch is turned on by using said second key within a predetermined time period after the second detection means detects that the operation switch is turned on and off the predetermined plurality of times by using said first key; and (j) a third key having a specific fourth code which is different from said specific first, second, and third codes, wherein said first detection means detects whether or not the operation switch is turned on by using said third key within a predetermined time period after said second key is pulled out of the operation switch, after said specific third code has been registered in said first code storage means, and wherein said first code registration means registers said specific fourth code if the operation switch is turned on by using said third key within the predetermined time period.

19. The anti-vehicle-thief apparatus as recited in claim 18, wherein said first code storage means clears the other codes which have been already registered, except for said specific first code, when said first detection means detects that the operation switch is turned on and off the predetermined plurality of times.

20. The anti-vehicle-thief apparatus as recited in claim 18, further comprising code registration prohibition means for prohibiting code registration by said first code registration means if the operation switch is not turned on by using said second key within a predetermined time period after the second detection means detects that the operation switch is turned on and off the predetermined plurality of times.

21. The anti-vehicle-thief apparatus as recited in claim 18, wherein said code reading means reads said specific second code a plurality of times, and said determination means checks whether or not specific second codes read by said code reading means the plurality of times are identical with each other, and prohibits code registration by said code registration means if specific second codes read by said code reading means are not identical with each other.

22. The anti-vehicle-thief apparatus as recited in claim 18, further comprising:
engine revolution detection means for detecting engine revolution;
voltage detection means for detecting voltage of power supply; and
means for prohibiting code registration by said code registration means when the engine revolution and the voltage is lower than a predetermined value.

23. The anti-vehicle-thief apparatus according to claim 18, wherein when the operation switch is not turned on by using said third key within the predetermined time period, said first code registration means do not register said specific fourth code even if the operation switch is turned on by using said third key after the predetermined time period passes.

24. The anti-vehicle-thief apparatus as recited in claim 18, further comprising:
engine control means for causing an engine to stop when said first determination means determines that said first key is invalid.

25. The anti-vehicle-thief apparatus as recited in claim 24, wherein said engine control means includes second code storage means for storing said specific first code, and second code comparison means for comparing said specific first code with said specific second code.

26. The anti-vehicle-thief apparatus as recited in claim 25, wherein said specific third code is registered with said first and second code storage means simultaneously.

27. The anti-vehicle-thief apparatus as recited in claim 26, wherein registration by said first code registration means is performed if the operation switch is turned on by using said second key within the predetermined time period after detecting that the operation switch is turned on and off the predetermined plurality of times.

28. The anti-vehicle-thief apparatus as recited in claim 26, wherein said second code storage means clears the other codes which have been already registered, except for said specific first code, when said first detection means detects that the operation switch is turned on and off the predetermined plurality of times.

29. The anti-vehicle-thief apparatus as recited in claim 26, wherein said specific third code is transmitted to said engine control means and registered with said second code storage means.

30. The anti-vehicle-thief apparatus as recited in claim 18, further comprising:
(k) fourth detection means for detecting whether said first code storage means is a first state or a second state;
(l) second code registration means for registering said specific second code with said first code storage means if said first code storage means is the second state;
wherein the first code comparison means compares said specific first code with said specific second code when said first code storage means is the first state.

31. The anti-vehicle-thief apparatus as recited in claim 30, wherein said code reading means reads said specific second code a plurality of times, and said first determination means checks whether or not specific second codes read by said code reading means the plurality of times are identical with each other, and prohibits code registration by said second code registration means if specific second codes read by said code reading means are not identical with each other.

32. The anti-vehicle-thief apparatus as recited in claim 30, wherein said first state is a non-initial state and said second state is an initial state.

33. The anti-vehicle-thief apparatus as recited in claim 30, further comprising:
engine control means for causing an engine to stop if said first key is invalid.

34. The anti-vehicle-thief apparatus as recited in claim 33, further comprising:
engine revolution detection means for detecting engine revolution;
voltage detection means for detecting voltage of power supply; and
means for prohibiting code registration by said first code registration means if the engine revolution and the voltage is lower than a predetermined value.

35. The anti-vehicle-thief apparatus as recited in claim 33, wherein said engine control means includes third code storage means for storing said specific first code, and third code comparison means for comparing said specific first code with said specific second code.

36. The anti-vehicle-thief apparatus as recited in claim 35, wherein said engine control means includes third code registration means for registering said specific second code with said third code storage means if said third code storage means is the second state.

37. The anti-vehicle-thief apparatus as recited in claim 36, wherein said engine control means includes fifth detection means for detecting said specific second code a plurality of times, and third determination means for determining that said first key is valid when said specific second code is identical to said specific first code, and that said first key is invalid when said specific second code is not identical to said specific first code, wherein said third determination means checks whether or not specific second codes read by said fifth detection means the plurality of times are identical with each other, and prohibits code registration by said third code registration means if specific second codes read by said fifth detection means are not identical with each other.

38. The anti-vehicle-thief apparatus as recited in claim 36, wherein said specific second code is transmitted to said engine control means and registered to said third code storage means.

* * * * *

UNITED STATES PATENT AND TRADEMARK OFFICE
CERTIFICATE OF CORRECTION

PATENT NO.   : 6,008,722
DATED        : December 28, 1999
INVENTOR(S)  : Manabu Hirozawa et al.

Page 1 of 8

It is certified that error appears in the above-identified patent and that said Letters Patent is hereby corrected as shown below:

Title page,
Item [30] Foreign ApplicationPriority Data, delete:
"Aug. 2, 1994    [JP]    Japan    6-181147";

Item [56] References Cited,
U.S. PATENT DOCUMENTS, add:
-- 5,309,152    5/1994    Krucoff    340/825.31 --;

Item [57] ABSTRACT,
Line 3, after "key" delete "1".

Signed and Sealed this

Twenty-fifth Day of December, 2001

Attest:

Attesting Officer

JAMES E. ROGAN
Director of the United States Patent and Trademark Office

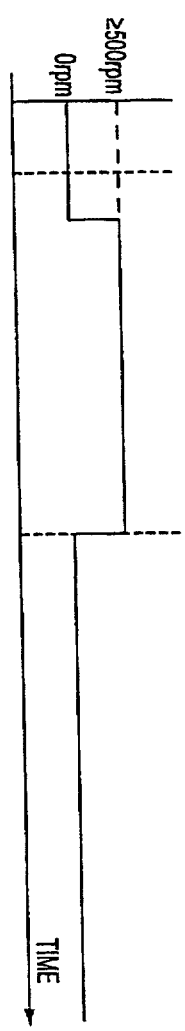
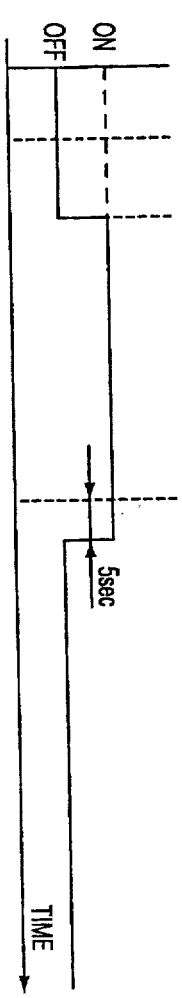
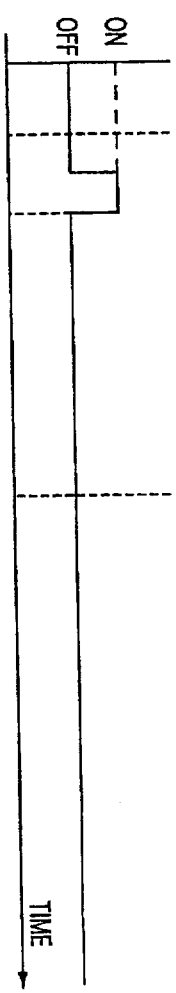
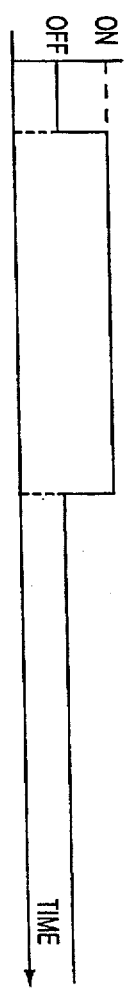
FIG. 9A
FIG. 9B COMMUNICATION BETWEEN IMMOBILIZER UNIT AND TRANSPONDER
FIG. 9C STATE OF IMMOBILIZER UNIT
FIG. 9D ENGINE ROTATION

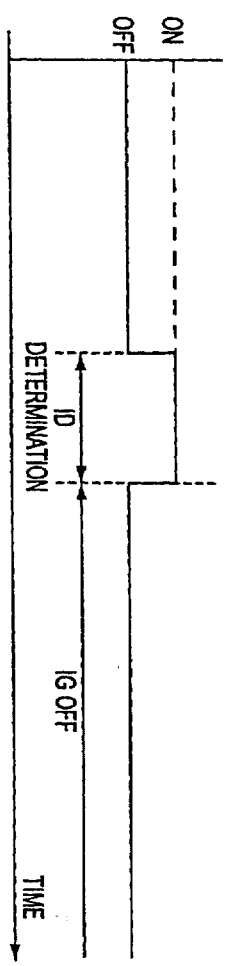
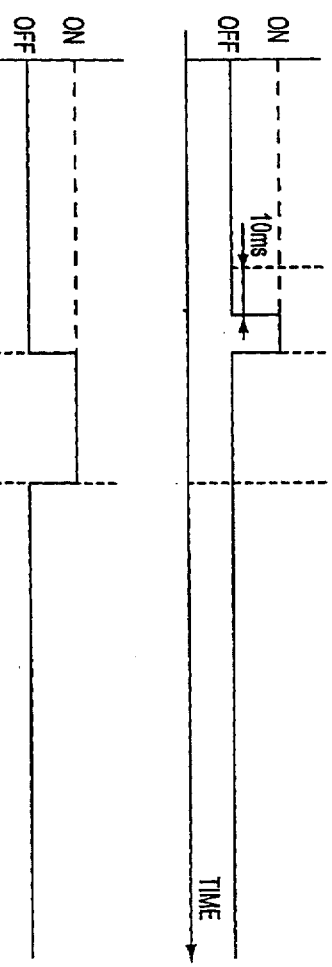
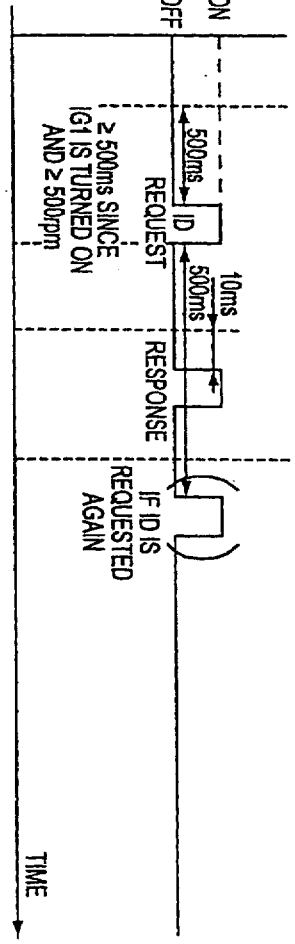

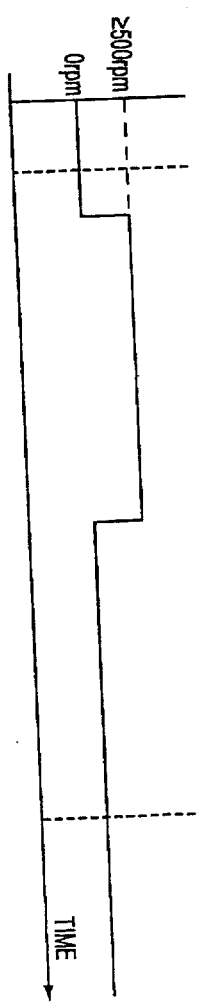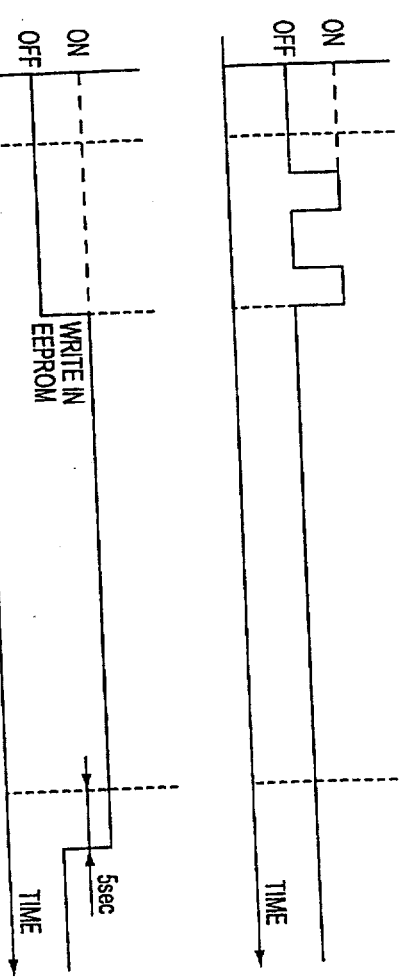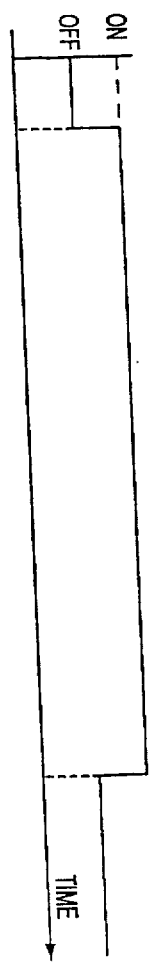
FIG. 10A IG1
FIG. 10B COMMUNICATION BETWEEN IMMOBILIZER UNIT AND TRANSPONDER
FIG. 10C STATE OF IMMOBILIZER UNIT
FIG. 10D ENGINE ROTATION

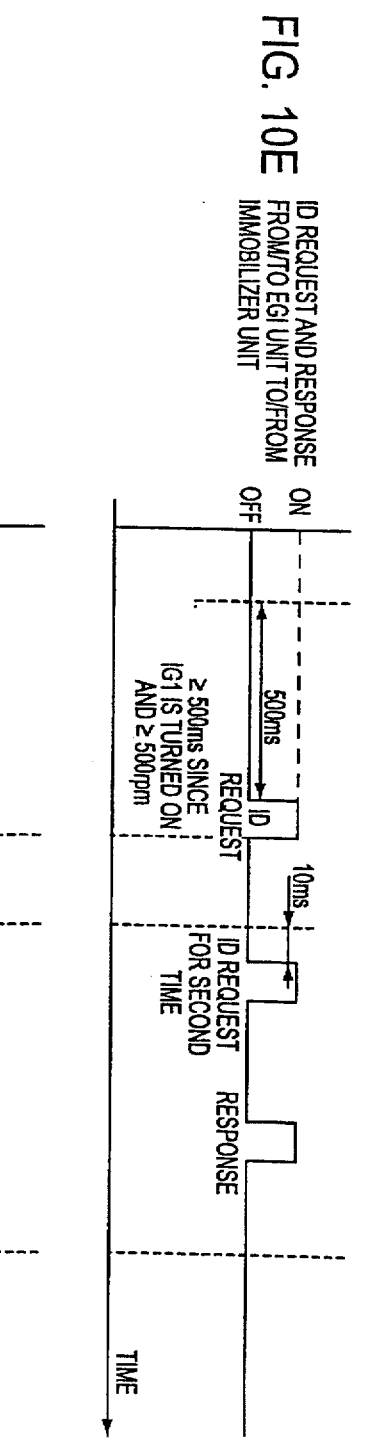
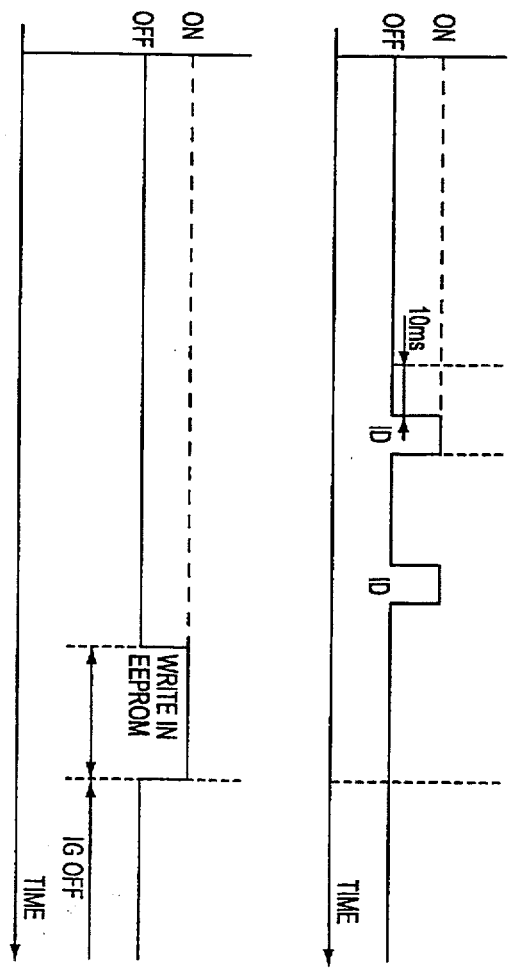
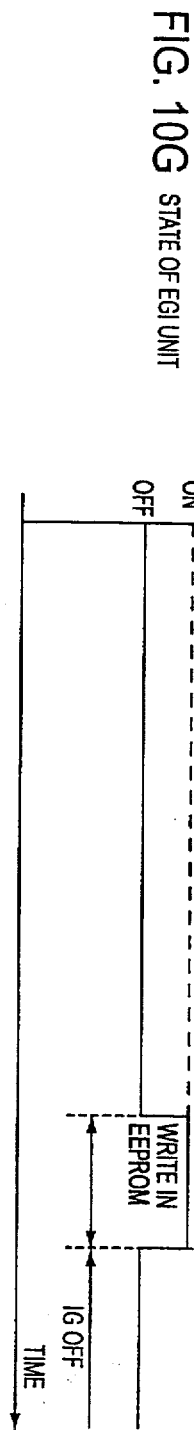
FIG. 10E ID REQUEST AND RESPONSE FROM/TO EGI UNIT TO/FROM IMMOBILIZER UNIT
FIG. 10F ID TRANSMISSION OR THE LIKE FROM IMMOBILIZER UNIT TO EGI UNIT
FIG. 10G STATE OF EGI UNIT

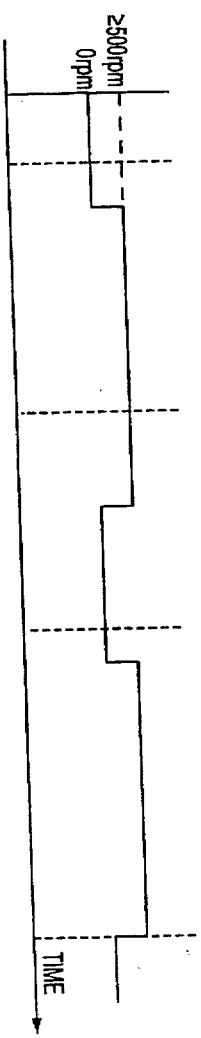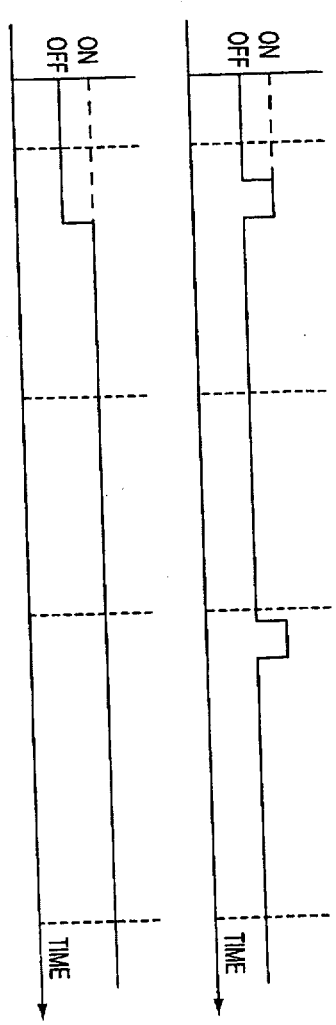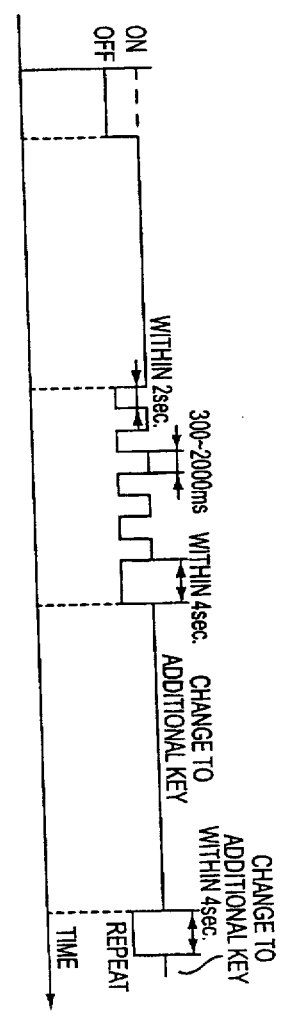

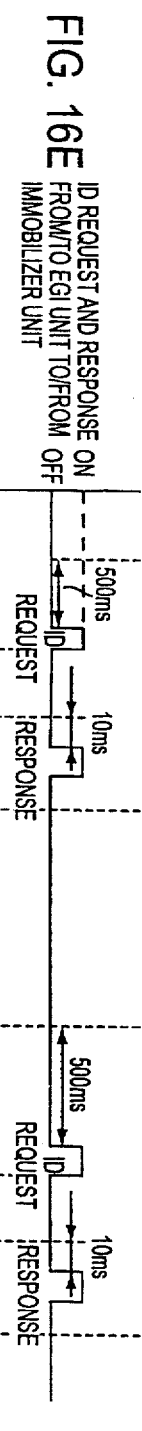
FIG. 16E ID REQUEST AND RESPONSE ON FROM/TO EGI UNIT TO/FROM IMMOBILIZER UNIT
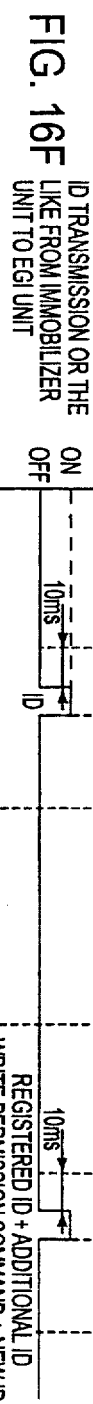
FIG. 16F ID TRANSMISSION OR THE LIKE FROM IMMOBILIZER UNIT TO EGI UNIT
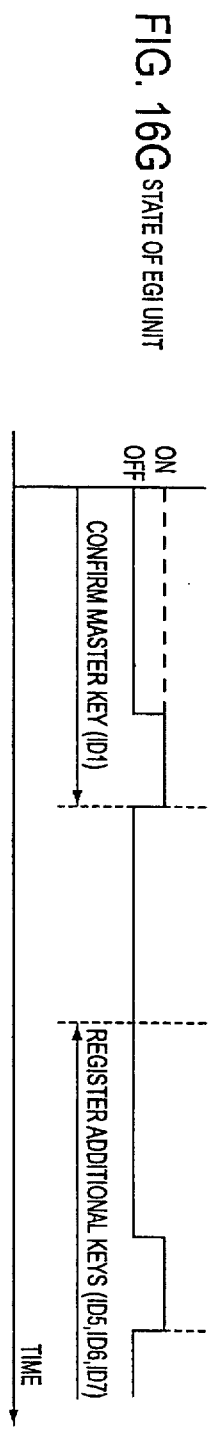
FIG. 16G STATE OF EGI UNIT

UNITED STATES PATENT AND TRADEMARK OFFICE
CERTIFICATE OF CORRECTION

PATENT NO. : 6,008,722
DATED : December 28, 1999
INVENTOR(S) : Manabu Hirozawa et al.

It is certified that error appears in the above-identified patent and that said Letters Patent is hereby corrected as shown below:

Please delete all drawing sheets FIGS. 4, 9A-9G, 10A-10G and 16A-16G and substitute drawing sheets FIGS. 4, 9A-9G, 10A-10G and 16A-16G as per attached.

Signed and Sealed this

Tenth Day of August, 2004

JON W. DUDAS
*Acting Director of the United States Patent and Trademark Office*

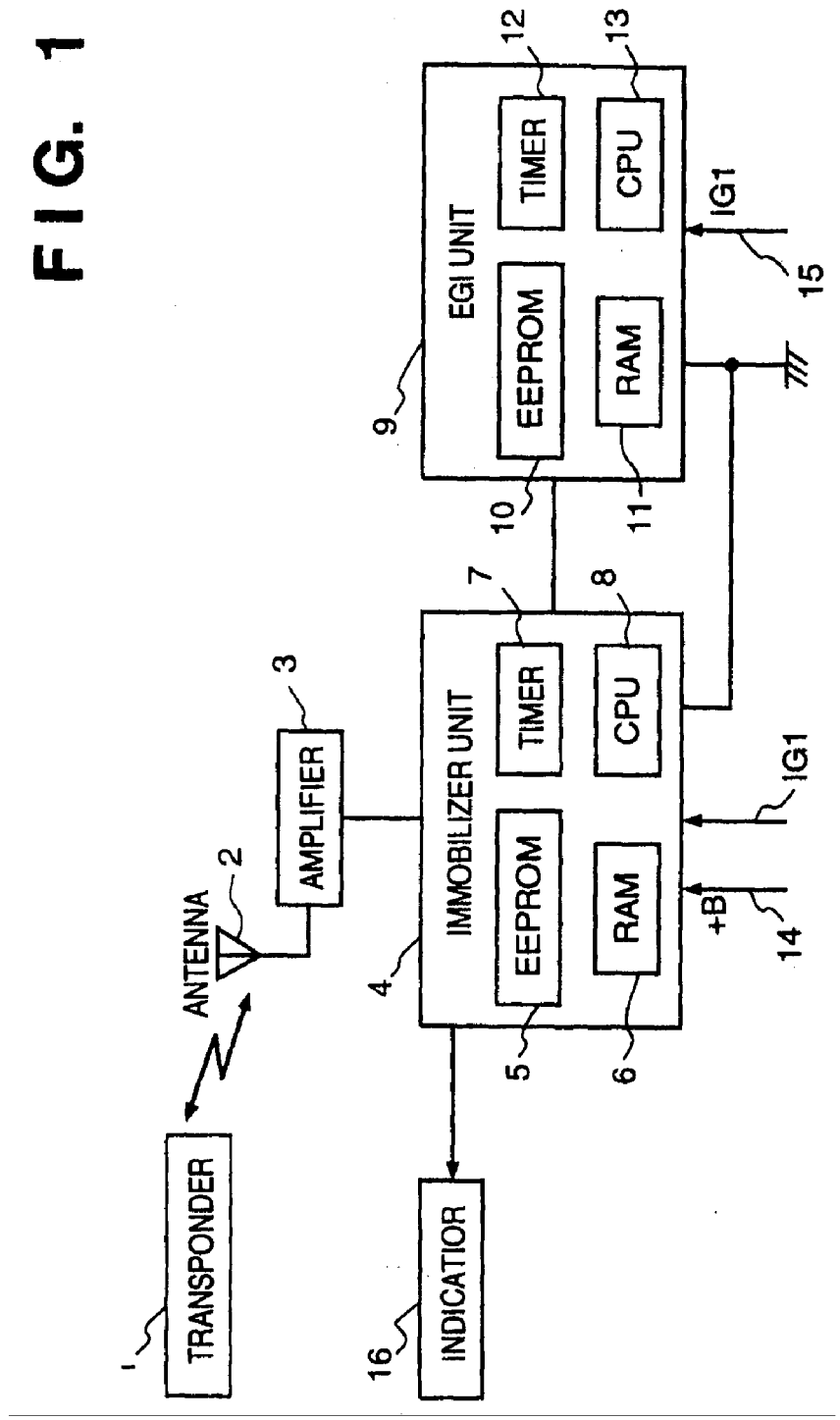

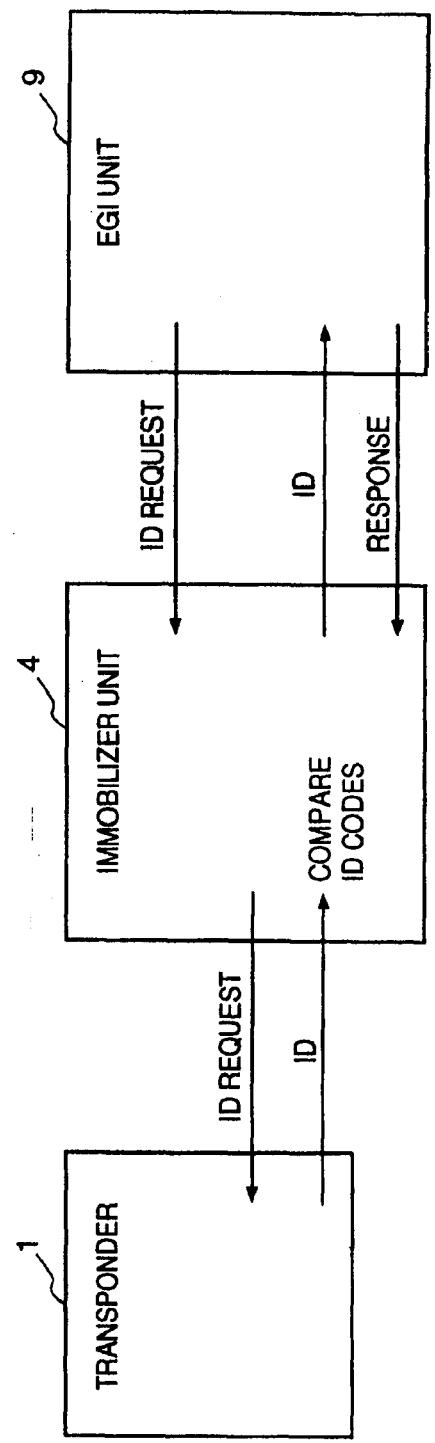

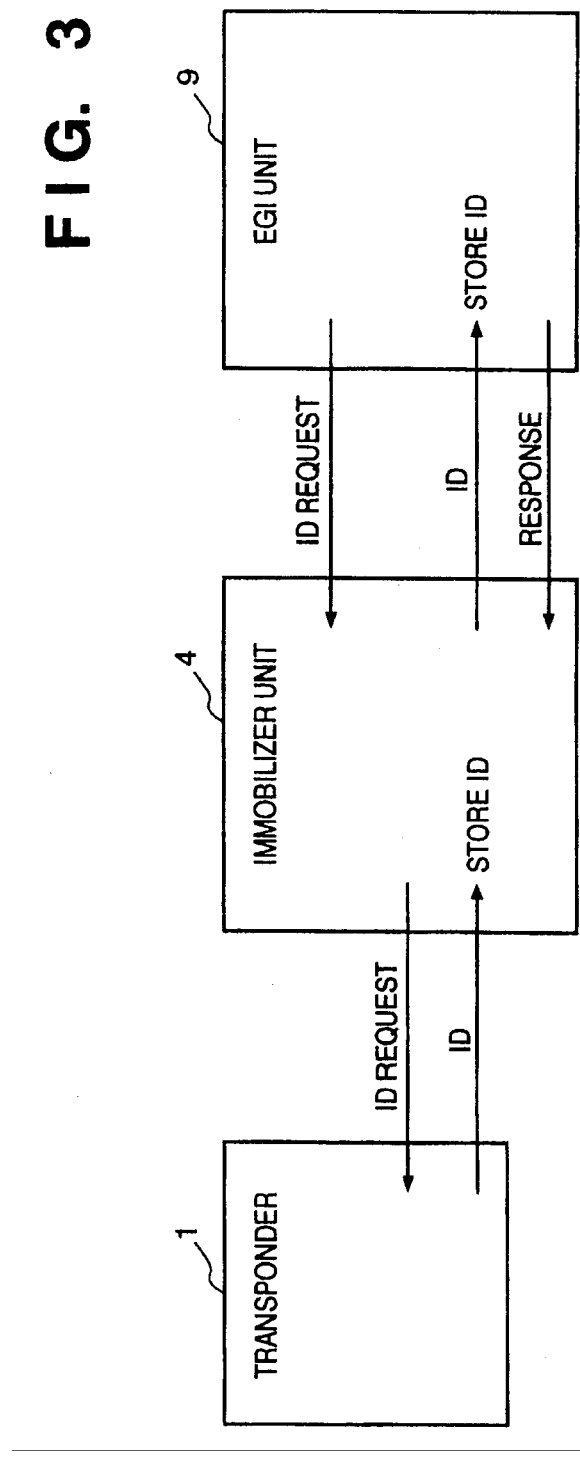

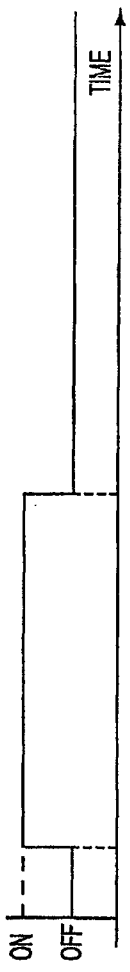
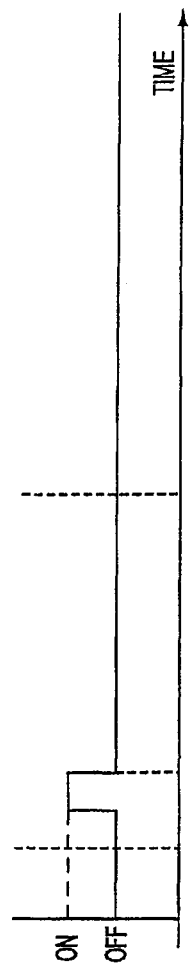
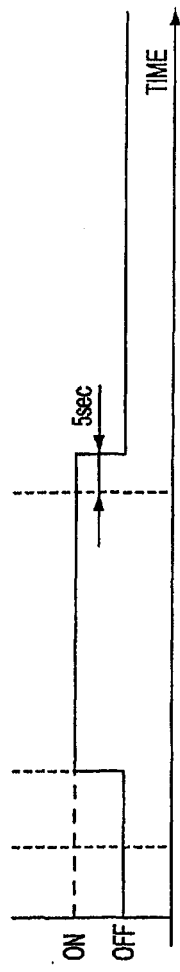
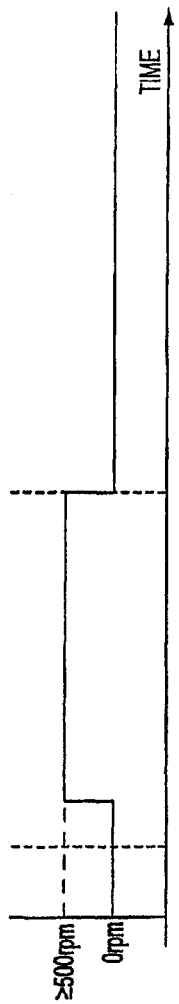
FIG. 9A IG1
FIG. 9B COMMUNICATION BETWEEN IMMOBILIZER UNIT AND TRANSPONDER
FIG. 9C STATE OF IMMOBILIZER UNIT
FIG. 9D ENGINE ROTATION

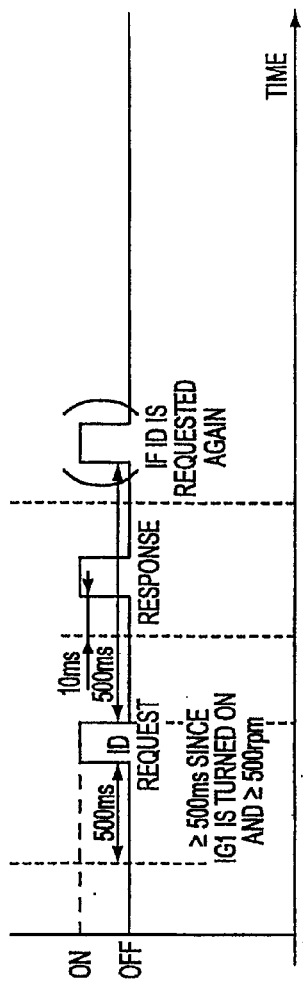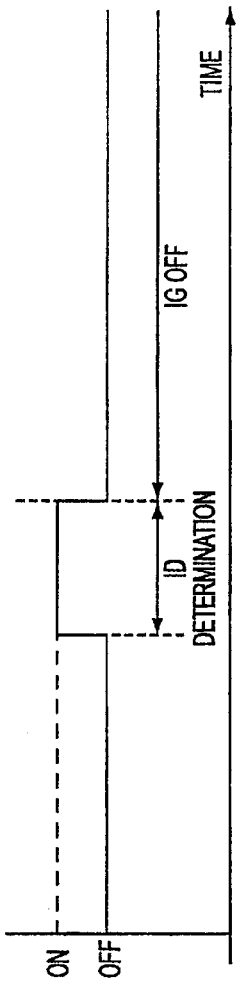

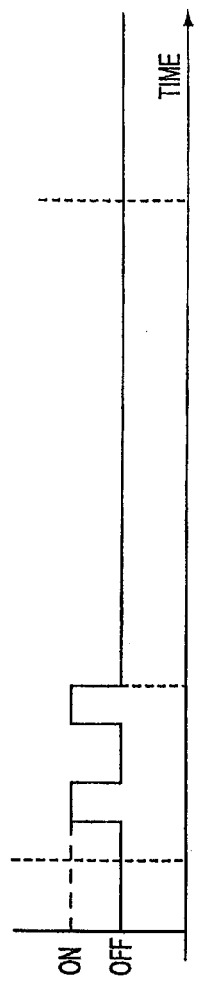
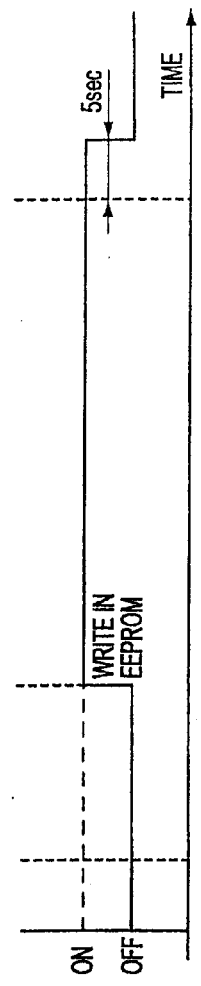
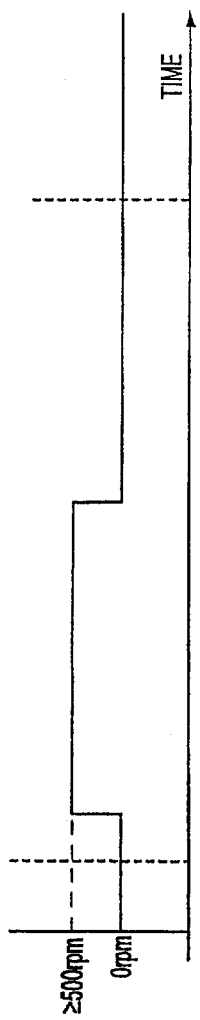
FIG. 10A IG1
FIG. 10B COMMUNICATION BETWEEN IMMOBILIZER UNIT AND TRANSPONDER
FIG. 10C STATE OF IMMOBILIZER UNIT
FIG. 10D ENGINE ROTATION

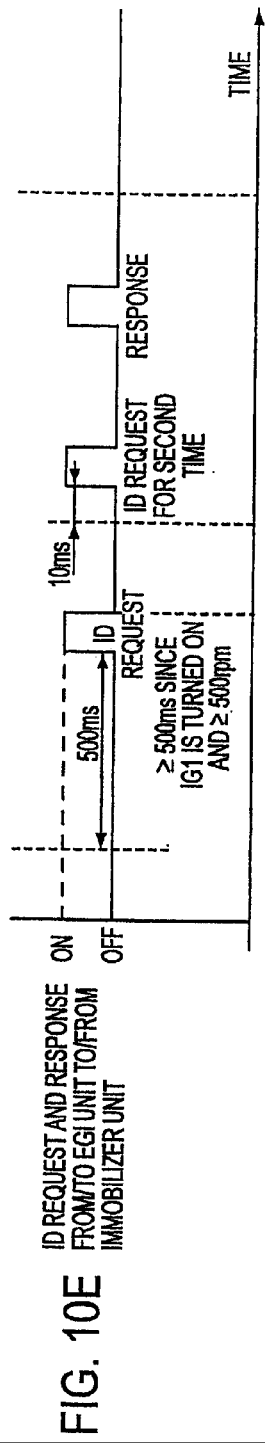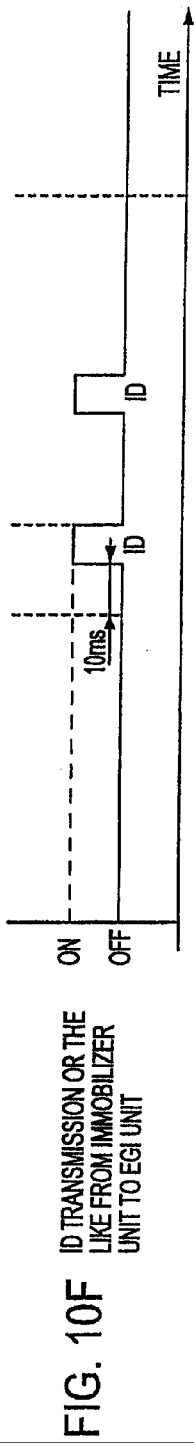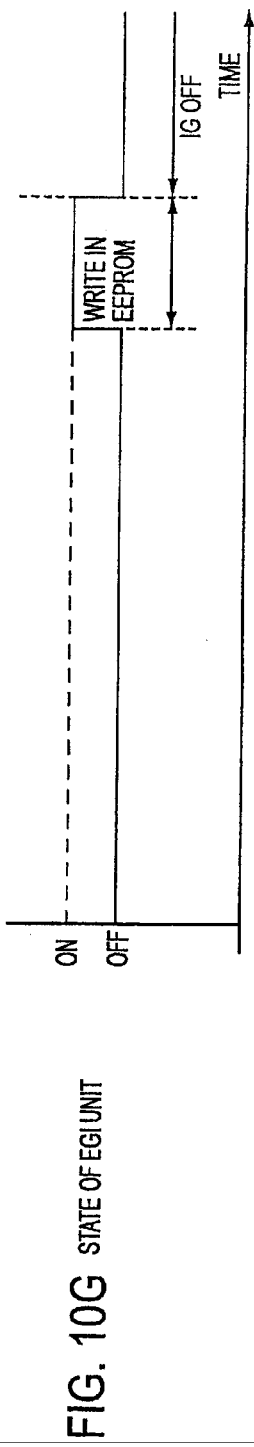

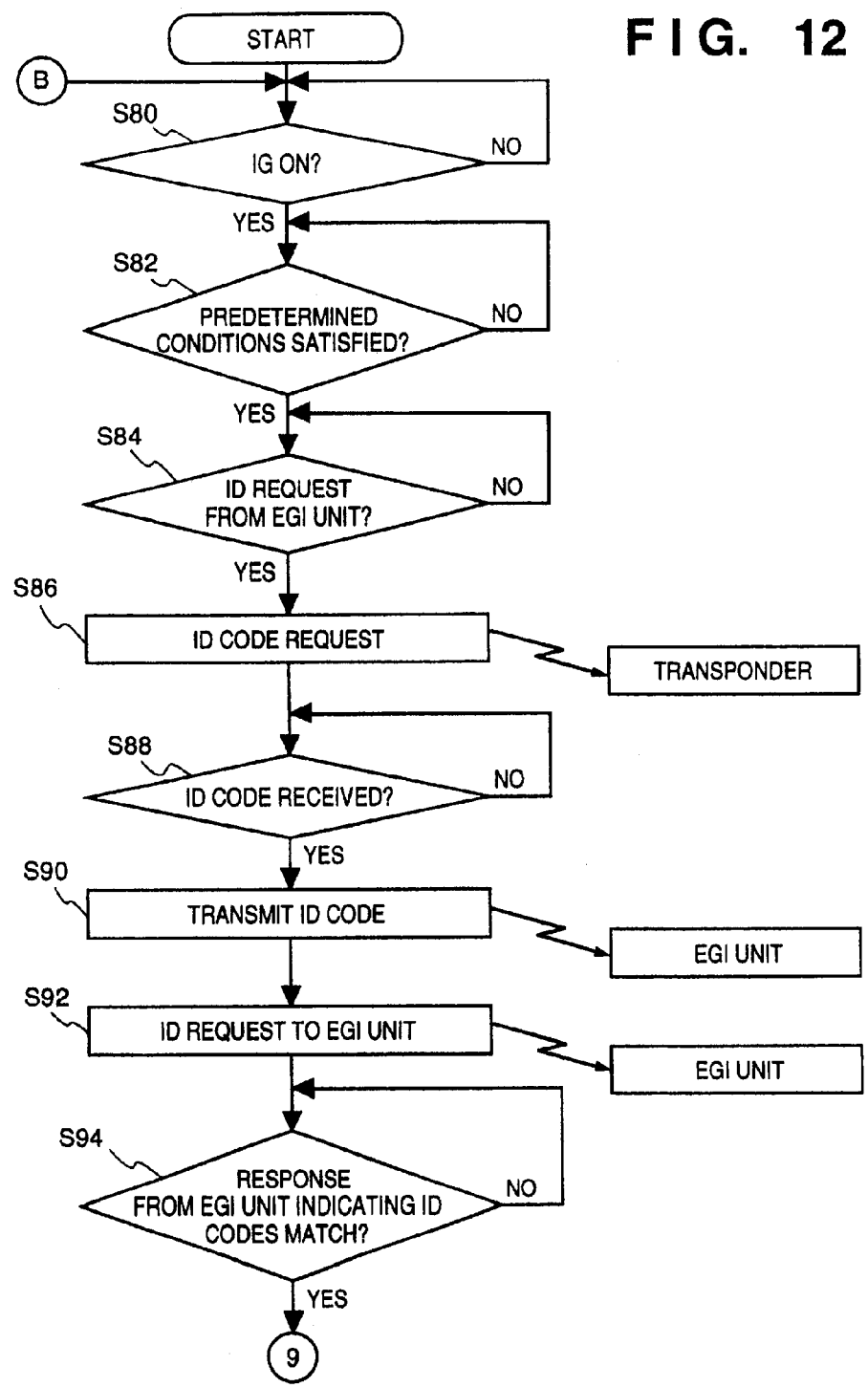

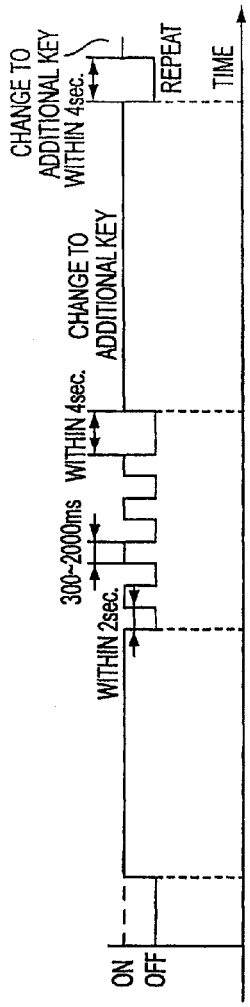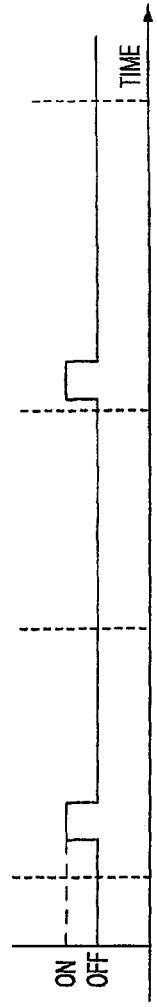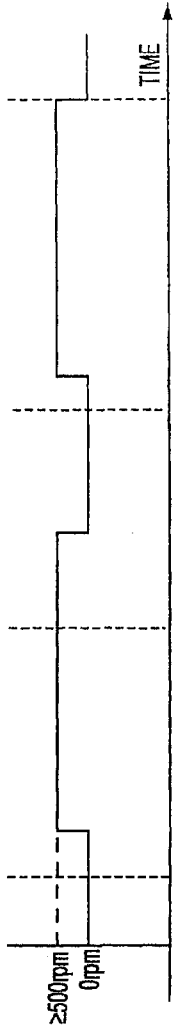
FIG. 16A IG1
FIG. 16B COMMUNICATION BETWEEN IMMOBILIZER UNIT AND TRANSPONDER
FIG. 16C STATE OF IMMOBILIZER UNIT
FIG. 16D ENGINE ROTATION